United States Patent
Sumiya

(10) Patent No.: US 11,626,135 B2
(45) Date of Patent: Apr. 11, 2023

(54) MAGNETIC TAPE CARTRIDGE AND METHOD OF MANUFACTURING MAGNETIC TAPE CARTRIDGE

(71) Applicant: FUJIFILM CORPORATION, Tokyo (JP)

(72) Inventor: Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/683,264

(22) Filed: Feb. 28, 2022

(65) Prior Publication Data

US 2022/0310120 A1    Sep. 29, 2022

(30) Foreign Application Priority Data

Mar. 25, 2021 (JP) .............................. JP2021-052312

(51) Int. Cl.
| | |
|---|---|
| *G11B 23/107* | (2006.01) |
| *G11B 5/78* | (2006.01) |
| *G11B 23/04* | (2006.01) |

(52) U.S. Cl.
CPC .............. *G11B 5/78* (2013.01); *G11B 23/047* (2013.01); *G11B 23/107* (2013.01)

(58) Field of Classification Search
None
See application file for complete search history.

(56) References Cited

U.S. PATENT DOCUMENTS

| | | | | |
|---|---|---|---|---|
| 7,316,367 | B2 * | 1/2008 | Hiraguchi | G11B 23/107 242/348.2 |
| 2001/0024343 | A1 * | 9/2001 | Shiga | G11B 23/107 |
| 2002/0104913 | A1 * | 8/2002 | Ishihara | G11B 23/045 242/348.2 |
| 2003/0234308 | A1 * | 12/2003 | Hiraguchi | G11B 23/107 242/348.2 |

FOREIGN PATENT DOCUMENTS

| | | | | |
|---|---|---|---|---|
| EP | 0924702 | A1 * | 6/1999 | ........... G11B 23/037 |
| EP | 1126461 | A2 * | 8/2001 | ........... G11B 23/037 |
| EP | 1684295 | A1 * | 7/2006 | ............. G11B 23/04 |
| EP | 1806749 | A1 * | 7/2007 | ........... G11B 23/037 |
| EP | 1667151 | B1 * | 2/2008 | ............. G11B 23/04 |
| JP | H11-306722 | A | 11/1999 | |
| JP | 2001-035127 | A | 2/2001 | |
| JP | 2001-148179 | A | 5/2001 | |
| JP | 2003-077252 | A | 3/2003 | |
| JP | 2005-346854 | A | 12/2005 | |

* cited by examiner

*Primary Examiner* — William J Klimowicz
(74) *Attorney, Agent, or Firm* — Solaris Intellectual Property Group, PLLC

(57) ABSTRACT

A magnetic tape cartridge includes a case that houses a magnetic tape and has an opening, a door that is provided in the case and closes the opening, and a fixing portion that fixes the door to the case.

15 Claims, 20 Drawing Sheets

MAGNETIC TAPE CARTRIDGE AND METHOD OF MANUFACTURING MAGNETIC TAPE CARTRIDGE

CROSS-REFERENCE TO RELATED APPLICATIONS

This application claims priority under 35 USC 119 from Japanese Patent Application No. 2021-052312 filed on Mar. 25, 2021, the disclosure of which is incorporated by reference herein.

BACKGROUND

1. Technical Field

A technique of the present disclosure relates to a magnetic tape cartridge and a method of manufacturing a magnetic tape cartridge.

2. Related Art

JP2001-148179A discloses a cartridge case that rotatably houses a single reel with a wound magnetic tape by superimposing an upper case and a lower case. In the cartridge case, a leader pin for leading out the magnetic tape is fixed to a distal end of the magnetic tape. In the cartridge case, both end portions of the leader pin are attachably and detachably fixed and held in a concave storage portion in an opening portion of the cartridge case by a locking member. Then, the cartridge case is a magnetic tape cartridge provided with a slide door for opening and closing the opening portion. In the magnetic tape cartridge, engaging protrusions that are engaged with engaging grooves provided in the upper case and the lower case of the cartridge case in a closed state of the slide door to inhibit the opening of the opening portion are formed on an inner surface of the slide door.

JP1999-306722A (JP-H11-306722A) discloses a magnetic tape cartridge. In the magnetic tape cartridge, a single reel with a wound magnetic tape is rotatably housed in a cartridge case. In the magnetic tape cartridge, a slide door that slides in a moving path formed in the cartridge case to open and close a tape lead-out opening portion for leading out one end of the magnetic tape is provided. In the magnetic tape cartridge, a sliding surface of the slide door facing a sliding surface of the moving path is formed in a convex shape.

JP2003-077252A discloses a cartridge case. The cartridge case is configured by assembling a pair of cartridge halves and comprises a cartridge body in which a tape reel is stored. The cartridge case comprises a door that is attached to a tape lead-out port formed on one side surface of the cartridge body to freely open and close the tape lead-lead port. In the cartridge case, a pair of guide passages that guides the door along an opening and closing direction of the tape lead-out port is formed in the cartridge body. Then, in the cartridge case, at least one of upper or lower end surface of the door and/or at least one of facing surfaces of a pair of guide passages facing the end surfaces of the door is subjected to sliding resistance reduction finishing.

JP2005-346854A discloses a door member for a tape cartridge. The door member for a tape cartridge comprises a flat plate-shaped door body that is attached to a case body of a tape cartridge and is made to slide with respect to the case body from a closing position where an opening portion for access in the case body is closed to an opening position where the opening portion is opened. The door member for a tape cartridge comprises a biasing unit attaching portion that is disposed on any one of an upper side or a lower side in a height direction in one side end surface of the door body such that a biasing unit biasing the door body toward the closing position can be attached. The door member for a tape cartridge comprises a slide unit contact portion that is disposed on the other side end surface of the door body such that a slide unit making the door body slide from the closing position toward the opening position can be brought into contact therewith. In the door member for a tape cartridge, the slide unit contact portion is formed such that any one side in the height direction in the other side end surface most protrudes along a direction of biasing by the biasing unit.

JP2001-35127A discloses a tape cartridge. In the tape cartridge, one tape reel with a wound tape is rotatably housed in a case body, and a distal end of the tape is fixed to a pin-shaped leader member and is led out from a tape lead-out port provided in the case body to an apparatus by the tape lead-out member. In the tape cartridge, a door member that opens and closes the tape lead-out port is provided, the door member slides in guide grooves formed in upper and lower cases, and roughness is formed in any one of the guide grooves of the upper and lower cases or portions on upper and lower sides of the door member that are guided to the guide grooves.

SUMMARY

An embodiment according to the technique of the present disclosure provides a magnetic tape cartridge and a method of manufacturing a magnetic tape cartridge that enable identification of an unused item.

A first aspect according to the technique of the present disclosure is a magnetic tape cartridge comprising a case that houses a magnetic tape and has an opening, a door that is provided in the case and closes the opening, and a fixing portion that fixes the door to the case.

A second aspect according to the technique of the present disclosure is the magnetic tape cartridge according to the first aspect, in which the fixing portion includes a protrusion, and the protrusion is formed in the door and is fixed to the case.

A third aspect according to the technique of the present disclosure is the magnetic tape cartridge according to the second aspect, in which the protrusion is fixed to the case by being welded to the case.

A fourth aspect according to the technique of the present disclosure is the magnetic tape cartridge according to the third aspect, in which the protrusion is welded to the case through an ultrasonic welding portion.

A fifth aspect according to the technique of the present disclosure is the magnetic tape cartridge according to any one of the second aspect to the fourth aspect, further comprising a guide mechanism that guides slide of the door in a first direction, in which the door has a first surface extending in the first direction, and the protrusion is provided on the first surface.

A sixth aspect according to the technique of the present disclosure is the magnetic tape cartridge according to the fifth aspect, in which the guide mechanism has a groove having a bottom surface facing the first surface, the groove houses an end portion on a first surface side of the door, and the protrusion is welded to the bottom surface of the groove.

A seventh aspect according to the technique of the present disclosure is the magnetic tape cartridge according to the fifth aspect or the sixth aspect, in which the protrusion is provided on an end portion side in a closing direction of the door in the first surface.

An eighth aspect according to the technique of the present disclosure is the magnetic tape cartridge according to any one of the fifth aspect to the seventh aspect, in which the protrusion is an elongated protrusion extending in the first direction.

A ninth aspect according to the technique of the present disclosure is the magnetic tape cartridge according to any one of the fifth aspect to the eighth aspect, in which the protrusion has a shape in which a cross-sectional area is reduced from a proximal end side toward a distal end side.

A tenth aspect according to the technique of the present disclosure is the magnetic tape cartridge according to the eighth aspect, in which the protrusion has a shape in which a width dimension is reduced toward a distal end side.

An eleventh aspect according to the technique of the present disclosure is the magnetic tape cartridge according to any one of the fifth aspect to the tenth aspect, in which the door has the first surface, and a second surface that is formed on an opposite side to the first surface in a second direction crossing the first direction and extends in the first direction, and the fixing portion has a first protrusion as the protrusion provided on the first surface, and a second protrusion as the protrusion provided on the second surface.

A twelfth aspect according to the technique of the present disclosure is the magnetic tape cartridge according to the eleventh aspect, in which the first protrusion is provided at a position on an opposite side to the second protrusion in the second direction.

A thirteenth aspect according to the technique of the present disclosure is the magnetic tape cartridge according to the eleventh aspect or the twelfth aspect, in which the first protrusion and the second protrusion have the same shape.

A fourteenth aspect according to the technique of the present disclosure is a method of manufacturing a magnetic tape cartridge, the method comprising providing a door in a case housing a magnetic tape and having an opening to close the opening with the door, and fixing the door to the case.

A fifteenth aspect according to the technique of the present disclosure is the method of manufacturing a magnetic tape cartridge according to the fourteenth aspect, in which the fixing of the door to the case includes fixing a protrusion formed in the door to the case through ultrasonic welding.

BRIEF DESCRIPTION OF THE DRAWINGS

Exemplary embodiments of the present disclosure will be described in detail based on the following figures, wherein.

DETAILED DESCRIPTION

Figure 1:
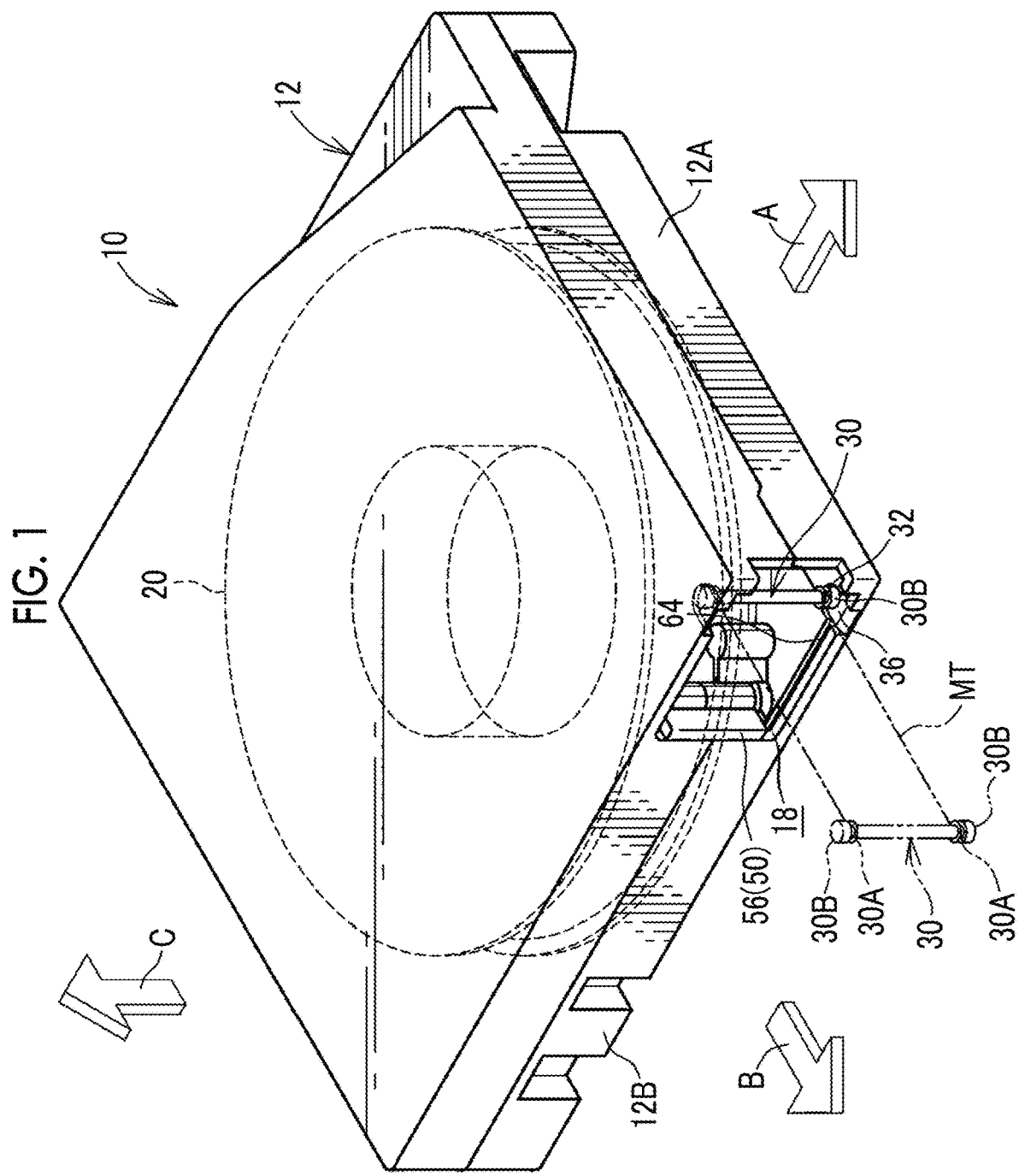
FIG. 1 is a perspective view of a magnetic tape cartridge according to an embodiment.

Hereinafter, an example of an embodiment of a magnetic tape cartridge and a method of manufacturing a magnetic tape cartridge according to the technique of the present disclosure will be described following the drawings.

First, an example of the configuration of a magnetic tape cartridge 10 will be described referring to FIGS. 1 to 3. In the following description, for convenience of description, in FIGS. 1 to 3, a loading direction of the magnetic tape cartridge 10 into a magnetic tape drive (not shown) is indicated by an arrow A. A direction of the arrow A is referred to as a front direction of the magnetic tape cartridge 10, and a side in the front direction of the magnetic tape cartridge 10 is referred to as a front side of the magnetic tape cartridge 10. In the following description of the structure, "front" indicates the front side of the magnetic tape cartridge 10.

In the following description, for convenience of description, in FIGS. 1 to 3, a direction of an arrow B perpendicular to the direction of the arrow A is referred to as a right direction, and a side in the right direction of the magnetic tape cartridge 10 is referred to as a right side of the magnetic tape cartridge 10. In the following description of the structure, "right" indicates the right side of the magnetic tape cartridge 10.

In the following description, for convenience of description, in FIGS. 1 to 3, a direction opposite to the direction of the arrow B is referred to as a left direction, and a side in the left direction of the magnetic tape cartridge 10 is referred to as a left side of the magnetic tape cartridge 10. In the following description of the structure, "left" indicates the left side of the magnetic tape cartridge 10.

In the following description, for convenience of description, in FIGS. 1 to 3, a direction perpendicular to the direction of the arrow A and the direction of the arrow B is indicated by an arrow C, a direction of the arrow C is referred to as an upper direction of the magnetic tape cartridge 10, and a side in the upper direction of the magnetic tape cartridge 10 is referred to as an upper side of the magnetic tape cartridge 10. In the following description of the structure, "upper" indicates the upper side of the magnetic tape cartridge 10.

In the following description, for convenience of description, in FIGS. 1 to 3, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description of the structure, "rear" indicates the rear side of the magnetic tape cartridge 10.

In the following description, for convenience of description, in FIGS. 1 to 3, a direction opposite to the upper direction of the magnetic tape cartridge 10 is referred to as a lower direction of the magnetic tape cartridge 10, and a side in the lower direction of the magnetic tape cartridge 10 is referred to as a lower side of the magnetic tape cartridge 10. In the following description of the structure, "lower" indicates the lower side of the magnetic tape cartridge 10.

In the following description, LTO will be described as an example of the standard of the magnetic tape cartridge 10. The specification of the magnetic tape cartridge 10 may conform to IBM3592. LTO is an abbreviation for "Linear Tape Open". IBM is an abbreviation for "International Business Machines Corporation".

Figure 2:
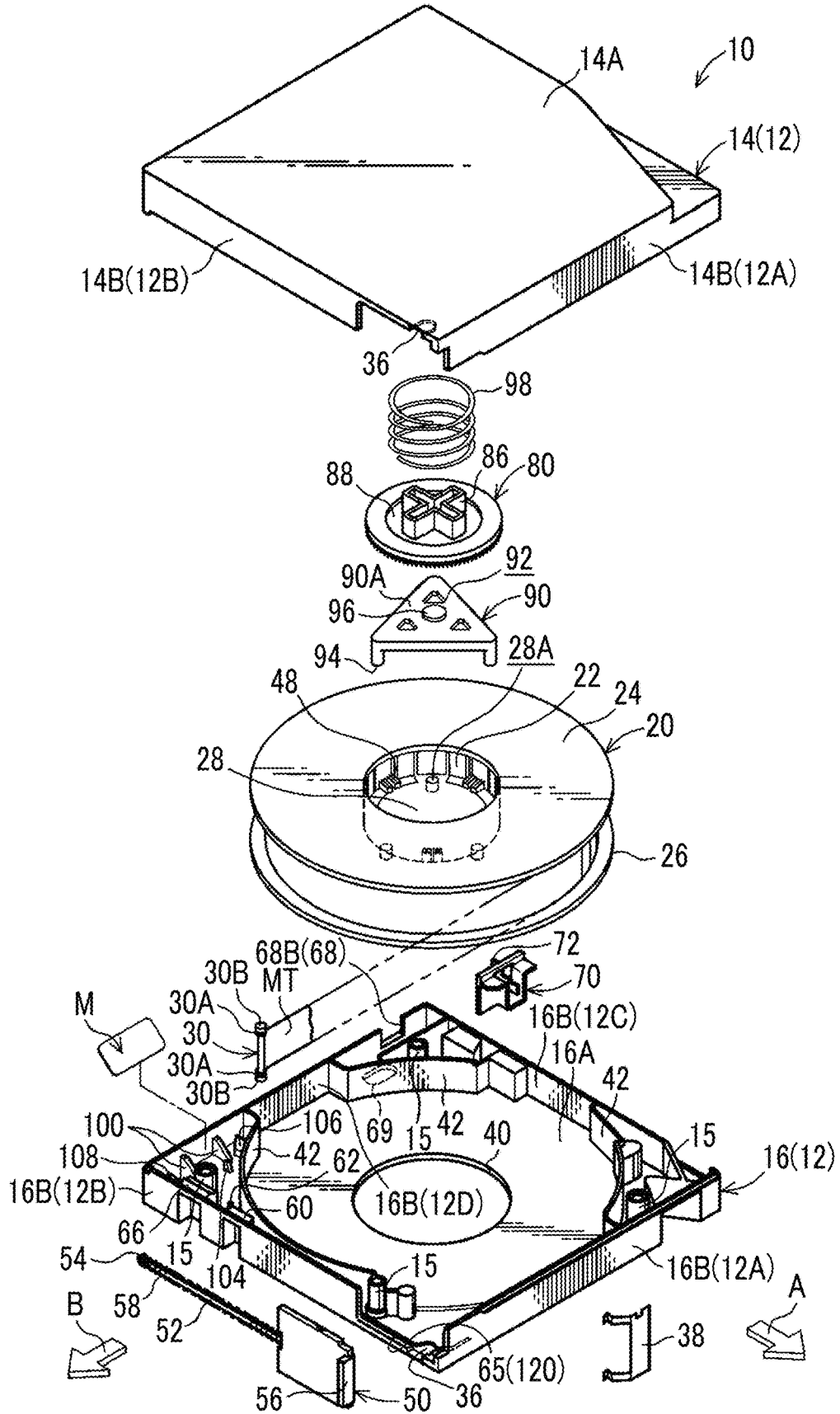
FIG. 2 is an exploded perspective view in a case where the magnetic tape cartridge of FIG. 1 is viewed from above.

As an example, as shown in FIGS. 1 and 2, the magnetic tape cartridge 10 has a substantially rectangular shape in plan view. The magnetic tape cartridge 10 comprises a box-shaped case 12. The case 12 is an example of a "case" according to the technique of the present disclosure. A magnetic tape MT is housed in the case 12. The case 12 is formed of resin, such as polycarbonate, and comprises an upper case 14 and a lower case 16. The upper case 14 and the lower case 16 are bonded by welding (for example, ultrasonic welding) or screwing in a state in which a lower peripheral edge surface of the upper case 14 and an upper peripheral edge surface of the lower case 16 are brought into contact with each other. A bonding method is not limited to welding or screwing, and other bonding methods may be used. A front direction, a rear direction, a left direction, a right direction, an upper direction, and a lower direction of the case 12 correspond to the front direction, the rear direction, the left direction, the right direction, the upper direction, and the lower direction of the magnetic tape cartridge 10, respectively.

Figure 3:
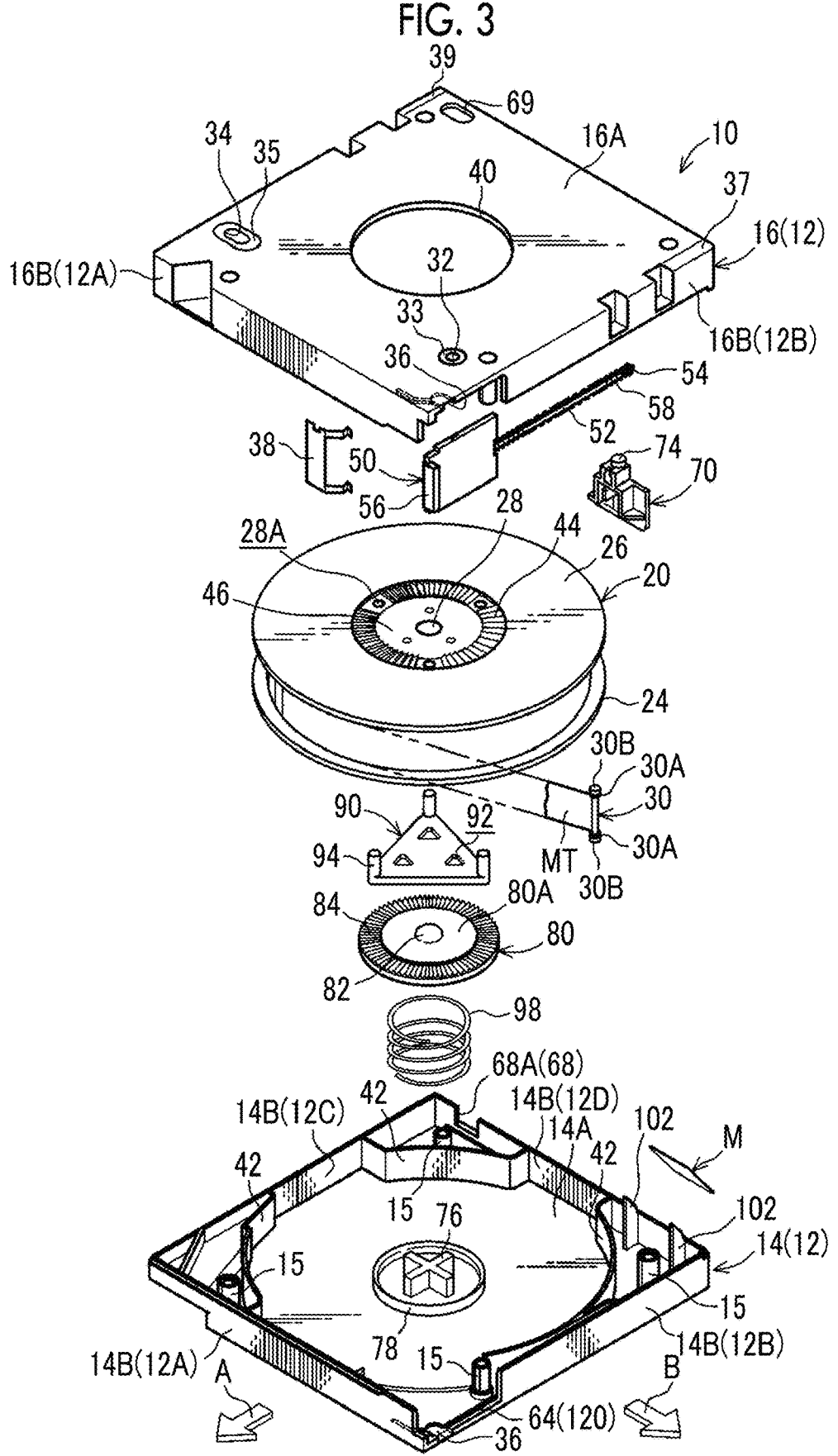
FIG. 3 is an exploded perspective view in a case where the magnetic tape cartridge of FIG. 1 is viewed from below.

As shown in FIGS. 2 and 3 as an example, screw bosses 15 are formed near respective corners in the upper case 14 and the lower case 16. The case 12 is assembled by screwing screws (not shown) into the screw bosses 15 from a lower surface side of the lower case 16.

As shown in FIG. 2 as an example, a cartridge reel 20 is rotatably housed inside the case 12. The cartridge reel 20 comprises a reel hub 22, an upper flange 24, and a lower flange 26. The reel hub 22 is formed in a cylindrical shape. The reel hub 22 is a shaft center portion of the cartridge reel 20. A shaft center direction of the reel hub 22 is along the up-down direction of the case 12. The reel hub 22 is disposed in a center portion of the case 12. Each of the upper flange 24 and the lower flange 26 is formed in an annular shape. A center portion of the upper flange 24 in plan view is fixed to an upper end portion of the reel hub 22. A center portion of the lower flange 26 in plan view is fixed to a lower end portion of the reel hub 22. The reel hub 22 and the lower flange 26 may be molded integrally.

The magnetic tape MT is wound around an outer peripheral surface of the reel hub 22. An end portion in a width direction of the magnetic tape MT is supported by the upper flange 24 and the lower flange 26.

The reel hub 22 has a bottom wall 28. The bottom wall 28 closes the lower end portion of the reel hub 22. As shown in FIG. 3 as an example, a reel gear 44 is formed in a ring shape on a lower surface of the bottom wall 28. In a center portion of the lower case 16, a gear opening 40 that exposes the reel gear 44 to the outside of the case 12 is formed. The reel gear 44 meshes with a drive gear (not shown) of a rotating shaft (not shown) in the magnetic tape drive in a state of being exposed from the gear opening 40. In a state in which the drive gear and the reel gear 44 mesh with each other, the rotating shaft of the magnetic tape drive is rotationally driven, whereby the cartridge reel 20 relatively rotates in the case 12 with respect to the case 12.

A reel plate 46 is attached to the lower surface of the bottom wall 28. The reel plate 46 is disposed on an inner side in a radial direction of the reel gear 44. As an example, the reel plate 46 is provided integrally with the bottom wall 28 by insert molding. The reel plate 46 is an annular metal plate. An axial center of the reel plate 46 is coincident with an axial center of the reel hub 22. Here, the term "coincident" indicates coincident in a meaning including an error that is generally allowed in the technical field to which the technique of the present disclosure belongs, and an error to such an extent not contrary to the spirit and scope of the technique of the present disclosure, in addition to completely coincident. The reel plate 46 is stuck and held by magnetic force of an annular magnet of the magnetic tape drive in a state in which the drive gear of the magnetic tape drive and the reel gear 44 mesh with each other. The annular magnet (not shown) is provided in the rotating shaft of the magnetic tape drive.

The cartridge reel 20 is surrounded by movement restricting walls 42 (see FIGS. 2 and 3) respectively provided on the inner surfaces of the upper case 14 and the lower case 16. The movement restricting walls 42 protrude from the inner surfaces of the upper case 14 and the lower case 16 toward the facing inner surfaces. The movement restricting walls 42 are disposed on a trajectory of a concentric circle of the gear opening 40. The cartridge reel 20 is held by the movement restricting walls 42.

As shown in FIG. 1 as an example, an opening 18 is formed in a right wall 12B of the case 12. The opening 18 is a rectangular opening for leading out the magnetic tape MT wound on the cartridge reel 20. A free end portion of the magnetic tape MT is led out from the opening 18. A leader pin 30 is attached to the free end portion of the magnetic tape MT. The leader pin 30 is locked by a lead-out member (not shown) of the magnetic tape drive and is operated to be led out. Both end portions of the leader pin 30 protrude from the end portion in the width direction of the magnetic tape MT. Annular grooves 30A are formed in both end portions of the leader pin 30, respectively. Hooks or the like of the lead-out members of the magnetic tape drive are hooked to the annular grooves 30A, whereby the leader pin 30 is locked to the lead-out member.

A pair of upper and lower pin holding portions 36 is provided on an inner side of the opening 18 of the case 12, that is, on an inner surface of a top plate 14A of the upper case 14 and an inner surface of a bottom plate 16A of the lower case 16. A pair of pin holding portions 36 holds the leader pin 30 in a positioned state in the case 12. The pin holding portions 36 have a substantially semicircular shape in which a lead-out side of the magnetic tape MT is opened. Both end portions 30B of the leader pin 30 in an upright state enter and exit the pin holding portions 36 from the opened sides of the pin holding portions 36.

As shown in FIGS. 2 and 3 as an example, a plate spring 38 is fixed near the pin holding portions 36. The plate spring 38 has a forked distal end portion. The forked distal end portion of the plate spring 38 is engaged with both end portions 30B of the leader pin 30, whereby the leader pin 30 is held in the pin holding portions 36 by the plate spring 38. In a case where the leader pin 30 enters and exits the pin holding portions 36, the forked distal end portion of the plate spring 38 is elastically deformed to allow the movement of the leader pin 30.

In the case 12, a door 50 that closes the opening 18 is provided. That is, the opening 18 of the case 12 is opened and closed by the door 50.

Figure 4:
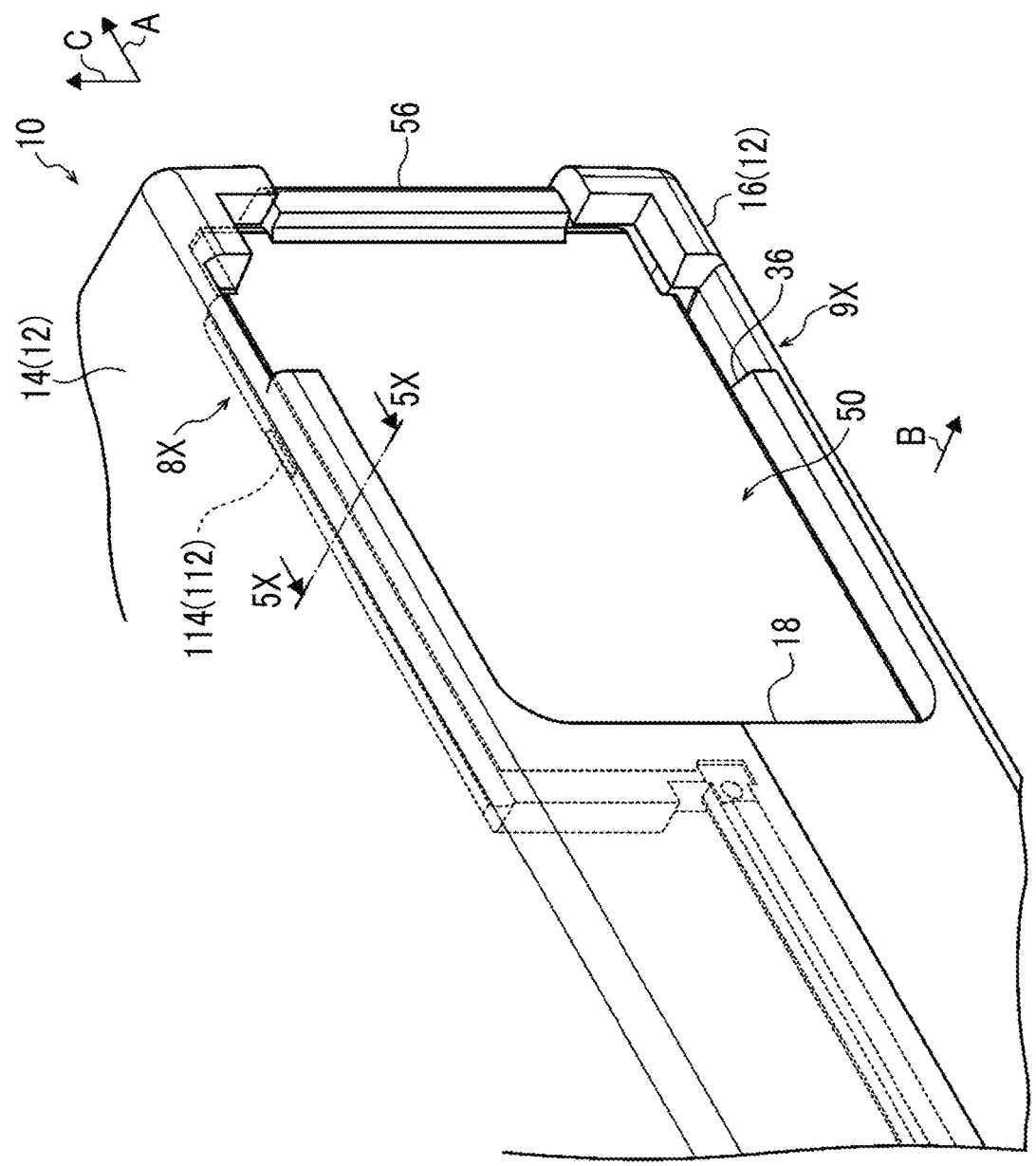
FIG. 4 is an enlarged perspective view of the periphery of a door of the magnetic tape cartridge of FIG. 1.
Figure 12:
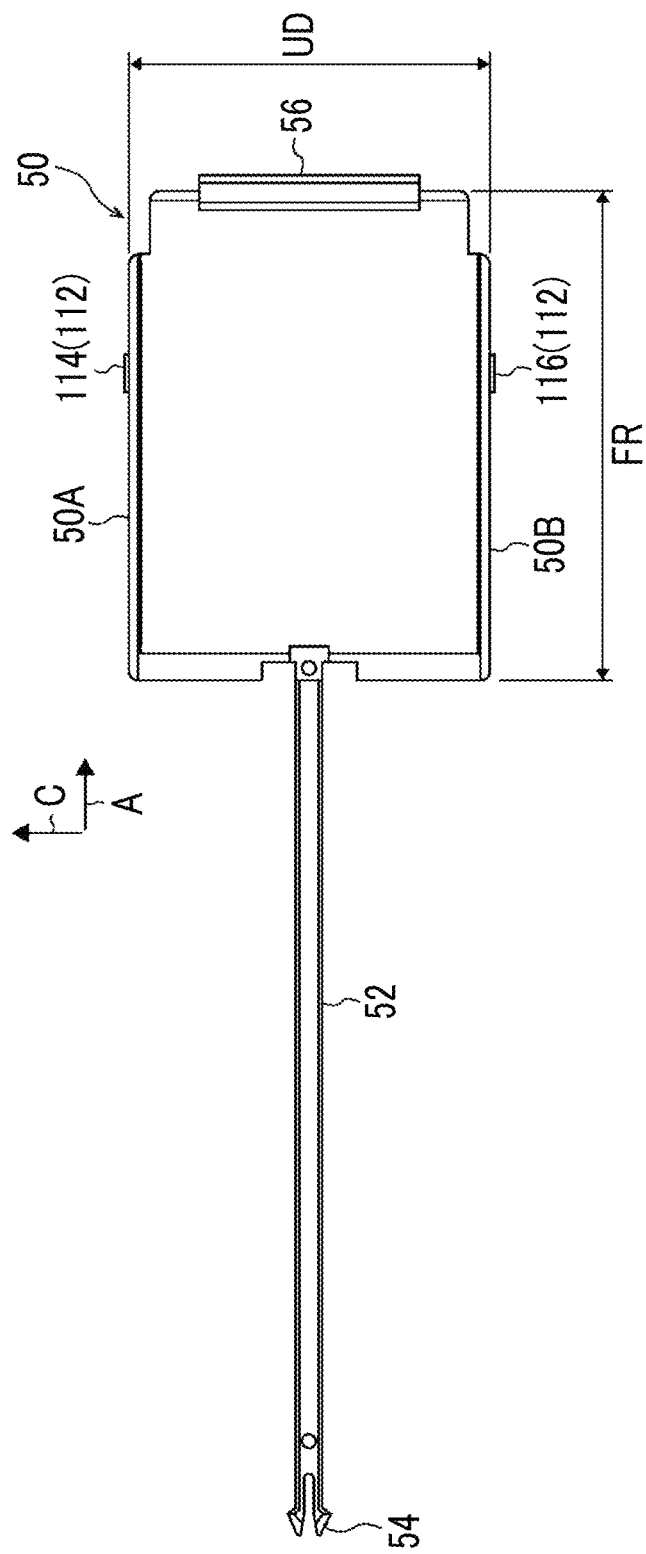
FIG. 12 is a side view of the door of FIG. 11.
Figure 13:
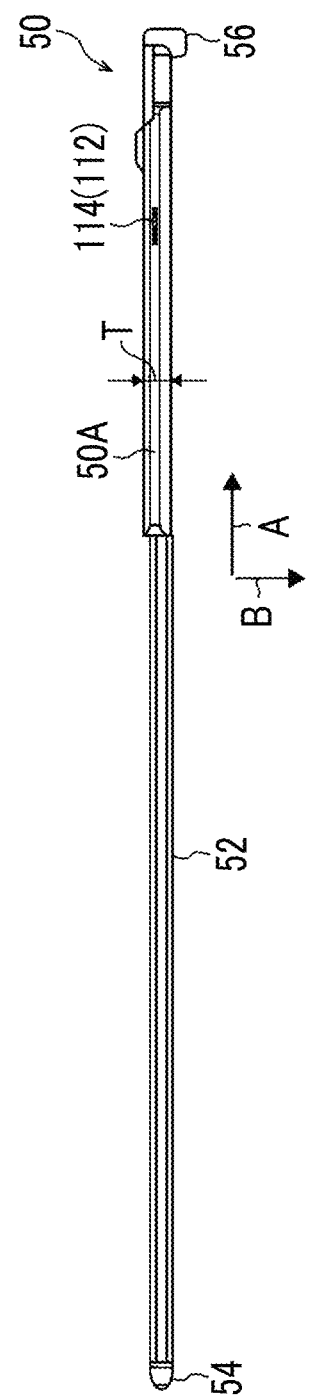
FIG. 13 is a top view of the door of FIG. 11.
Figure 14:
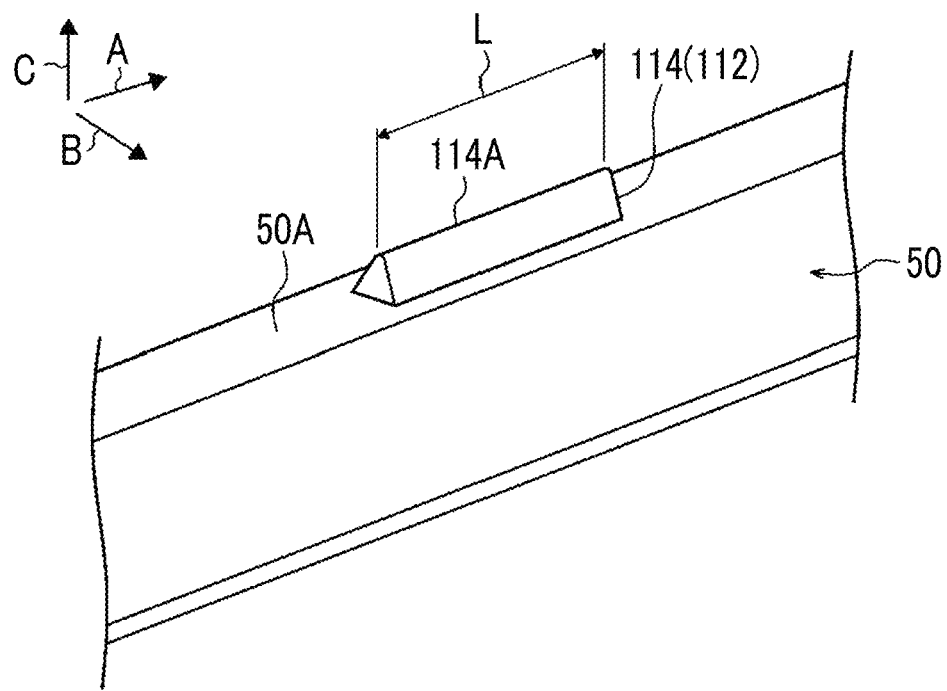
FIG. 14 is an enlarged perspective view of a portion indicated by an arrow 14X in FIG. 11.

As shown in FIGS. 2 and 3 as an example, the door 50 has a substantially rectangular plate shape and has a size to close the opening 18 (see FIG. 4). The door 50 has a first surface 50A extending in a front-rear direction of the case 12 (see FIG. 12). The door 50 has a second surface 50B extending in the front-rear direction of the case 12 (see FIG. 12). The second surface 50B is positioned on an opposite side to the first surface 50A in the up-down direction of the case 12. As an example, the first surface 50A is an upper surface of the door 50, and the second surface 50B is a lower surface of the door 50. The front-rear direction of the case 12 is an example of a "first direction" according to the technique of the present disclosure, and the up-down direction of the case 12 is an example of a "second direction" according to the technique of the present disclosure.

The case 12 comprises a guide mechanism 120 that guides slide in the front-rear direction of the door 50 in the case 12. The guide mechanism 120 has a groove 64. The groove 64 has a bottom surface 64A facing the first surface 50A (see FIG. 5). As an example, the groove 64 extending along the front-rear direction of the case 12 is provided in the top plate 14A of the case 12. In other words, the groove 64 extends along the right wall 12B of the case 12. The groove 64 houses an end portion on the first surface 50A side of the door 50, that is, an upper end portion of the door 50.

The guide mechanism 120 has a groove 65. The groove 65 has a bottom surface 65A facing the second surface 50B (see FIG. 5). As an example, the groove 65 extending along the front-rear direction of the case 12 is provided in the bottom plate 16A of the case 12. In other words, the groove 65 extends along the right wall 12B of the case 12. The groove 65 houses an end portion on the second surface 50B side of the door 50, that is, a lower end portion of the door 50.

The upper end portion and the lower end portion of the door 50 are guided by a pair of upper and lower grooves 64 and 65. With this, the door slides along the front-rear direction of the case 12.

As shown in FIGS. 2 and 3 as an example, a shaft 52 is provided at the center of a rear end portion of the door 50. The shaft 52 protrudes from the center of the rear end portion of the door 50 rearward of the case 12. The shaft 52 is disposed on an inner side of the coil spring 58. At a rear end of the shaft 52, an expansion portion 54 for falling prevention of the coil spring 58 is provided. A support 60 is provided on the inner surface of the lower case 16. The support 60 supports the shaft 52 to be slidable. The support 60 has a locking portion 62. The locking portion 62 locks a rear end of the coil spring 58. A support 66 is provided on the inner surface of the lower case 16 rearward of the case 12 from the support 60. The support 66 supports the shaft 52 to be slidable.

The door 50 is biased in a closing direction of closing the opening 18 by biasing force of the coil spring 58. On the other hand, in a case where the door 50 opens the opening 18, a front side of the shaft 52 in the case 12 is supported by the support 60, and a rear side of the shaft 52 in the case 12 is supported by the support 66.

In a front end portion of the door 50, a convex portion 56 for an opening and closing operation is provided. The convex portion 56 protrudes outward of the case 12. As an example, the convex portion 56 protrudes toward the left side of the case 12. The convex portion 56 is engaged with an opening and closing member (not shown) provided in the magnetic tape drive involving loading of the magnetic tape cartridge 10 into the magnetic tape drive. With the engagement of the convex portion 56 and the opening and closing member, the door 50 slides against the biasing force of the coil spring 58. With the slide of the door 50, the opening 18 is opened.

As shown in FIG. 3 as an example, in the bottom plate 16A of the lower case 16, a pair of reference hole 32 and reference hole 34 is formed separated in a right-left direction of the case 12. A part of reference hole 32 and reference hole 34 are holes not passing through the bottom plate 16A. A pair of reference hole 32 and reference hole 34 are recesses formed in the bottom plate 16A. The reference hole 32 is disposed on the right wall 12B side and a front wall 12A side of the bottom plate 16A. The shape of the reference hole 32 is a substantially circular shape in bottom view. The reference hole 34 is disposed on a left wall 12C side and the front wall 12A side of the bottom plate 16A. The shape of the reference hole 34 is a substantially elliptical shape that is long in the right-left direction of the case 12 in bottom view. A pair of reference hole 32 and reference hole 34 are formed at identical positions in the front-rear direction of the case 12.

In a state in which the magnetic tape cartridge 10 is loaded into the magnetic tape drive, positioning members (not shown) provided in the magnetic tape drive are inserted into the reference hole 32 and the reference hole 34, respectively. With this, in the magnetic tape drive, a front-rear direction and a right-left direction of the magnetic tape cartridge 10 are positioned.

In the periphery of the reference hole 32 in the bottom plate 16A, a mirror-finished circular reference surface 33 is formed. In the periphery of the reference hole 34 in the bottom plate 16A, a mirror-finished elliptical reference surface 35 is formed.

At a corner on a rear end side and the right wall 12B side in the bottom plate 16A, a mirror-finished rectangular reference surface 37 is formed. The rectangular shape of the reference surface 37 is a rectangular shape of which the longitudinal direction is set in parallel with the front-rear direction of the case 12. At a corner on the rear end side and the left wall 12C side in the bottom plate 16A, a mirror-finished rectangular reference surface 39 is formed. The rectangular shape of the reference surface 39 is a rectangular shape of which the longitudinal direction is set in parallel with the front-rear direction of the case 12.

The respective reference surfaces 33, 35, 37, and 39 are on the same plane.

In a state in which the magnetic tape cartridge 10 is loaded into the magnetic tape drive, positioning surfaces (not shown) provided in the magnetic tape drive are brought into contact with the reference surface 33 and the reference surface 35, and the reference surface 37 and the reference surface 39, respectively. With this, a thickness direction of the magnetic tape cartridge 10, in other words, an up-down direction of the magnetic tape cartridge 10 is positioned in the magnetic tape drive.

As shown in FIGS. 2 and 3 as an example, a write protect 70 with which whether or not recording on the magnetic tape MT is allowed is set is provided in a rear left portion of the case 12. The write protect 70 slides in the right-left direction of the case 12. The write protect 70 comprises an operating protrusion 72 that is manually operated by a user. At a rear wall 12D of the case 12, an opening hole 68 that makes the operating protrusion 72 protrude from the rear wall 12D is formed.

The opening hole 68 has a notched portion 68A formed at a peripheral wall 14B of the upper case 14, and a notched portion 68B formed at a peripheral wall 16B of the lower case 16. In the lower case 16, a long hole 69 with the right-left direction of the case 12 as a longitudinal direction is formed. Then, a protruding portion 74 of the write protect 70 is exposed from the long hole 69 of the lower case 16.

In a state in which the magnetic tape cartridge 10 is loaded into the magnetic tape drive, a position of the write protect 70 is detected on the magnetic tape drive side. With a detection result, determination regarding whether or not recording on the magnetic tape MT is allowed is made on the magnetic tape drive side.

A plurality of engaging gears 48 (see FIG. 2) are provided at intervals at a peripheral edge of an upper surface of the bottom wall 28 of the reel hub 22. In the embodiment, as an example, three engaging gears 48 disposed at 120-degree intervals in a circumferential direction of the reel hub 22 are provided at the bottom wall 28.

At the bottom wall 28 of the reel hub 22, a plurality of through-holes 28A (see FIG. 2) are provided on the reel gear 44 between the adjacent engaging gears 48 in the circumferential direction. In the embodiment, as an example, three through-holes 28A disposed at 120-degree intervals in the circumferential direction of the reel hub 22 are provided at the bottom wall 28. Then, a braking member 80 is inserted into the reel hub 22. The braking member 80 has a circular plate shape and is formed of a resin material.

As shown in FIG. 3 as an example, a braking gear 84 is formed in an annular shape at a peripheral edge of a lower surface 80A of the braking member 80. The braking gear 84 meshes with the engaging gears 48 (see FIG. 2). On an upper surface of the braking member 80, an engaging protrusion 86 (see FIG. 2) having a substantially cross shape in plan view is provided. A rotation restricting rib 76 (see FIG. 3) provided in the upper case 14 is inserted into the engaging protrusion 86. Here, the rotation restricting rib 76 protrudes from the inner surface of the top plate 14A of the upper case 14 downward in the case 12. The rotation restricting rib 76 is formed in a substantially cross shape in plan view. In a case where the up-down direction of the case 12 is set as the height direction of the engaging protrusion 86 and the rotation restricting rib 76, and a height of the engaging protrusion 86 is higher than a height of the rotation restricting rib 76. With this, the braking member 80 is non-rotatable with respect to the upper case 14. Rotation is restricted. On the other hand, the braking member 80 is movable in the reel hub 22 in the up-down direction of the case 12.

As shown in FIG. 3 as an example, a compression coil spring 98 is disposed between the upper case 14 and the braking member 80. As an example, one end of the compression coil spring 98 is in contact with an inner side of an annular protrusion 78 surrounding the rotation restricting rib 76 of the upper case 14. Specifically, one end of the compression coil spring 98 is in contact between the rotation restricting rib 76 and the annular protrusion 78. On the other hand, the other end of the compression coil spring 98 is in contact with the annular groove 88 (see FIG. 2) provided in the upper surface of the braking member 80. Then, the braking member 80 is biased downward in the case 12 by biasing force of the compression coil spring 98.

With this, when the magnetic tape cartridge 10 is not in use, the braking gear 84 meshes with the engaging gears 48, and relative rotation of the cartridge reel 20 with respect to the case 12 is inhibited. A state in which the relative rotation of the cartridge reel 20 with respect to the case 12 is inhibited is hereinafter referred to as a "rotation-locked state". In the rotation-locked state, the cartridge reel 20 is pressed against the lower case 16 side by the biasing force of the compression coil spring 98, and the reel gear 44 is exposed from the gear opening 40. A state in which the magnetic tape cartridge 10 is not in use indicates a state in which the magnetic tape cartridge 10 is not loaded into the magnetic tape drive.

As shown in FIG. 3 as an example, a release member 90 is disposed inside the reel hub 22 and below the braking member 80 in the case 12. The release member 90 is disposed between the bottom wall 28 and the braking member 80. The release member 90 has a substantially regular triangular shape in plan view and is molded with a resin material. A plurality of through-holes 92 for reduction in weight are formed in the release member 90.

Leg portions 94 are provided in apex portions of the regular triangular shape on the lower surface of the release member 90, respectively. Three leg portions 94 protrude from the lower surface of the release member 90 downward in the case 12. The three leg portions 94 are inserted into the three through-holes 28A of the bottom wall 28, respectively. A protruding height of each leg portion 94 is such a height that each leg portion 94 protrudes from the lower surface of the bottom wall 28 over the reel gear 44 by a predetermined height in a state of being inserted into the through-hole 28A.

A planar support convex portion 96 is provided at the center of an upper surface 90A (see FIG. 2) of the release member 90. A release protrusion 82 (see FIG. 3) having a substantially hemispherical shape of the braking member 80 is in contact with the support convex portion 96. The release protrusion 82 protrudes from the center of the lower surface 80A of the braking member 80 downward in the case 12. For this reason, a contact area of the braking member 80 and the release member 90 is reduced. With this, sliding resistance at the time of rotation of the cartridge reel 20 is reduced. As a material of the braking member 80, for example, polyacetal is used, and as a material of the release member 90, for example, polybutylene terephthalate is used.

As shown in FIGS. 2 and 3 as an example, in a rear right portion of the case 12, a cartridge memory M as an example of a noncontact communication medium is disposed to be inclined with respect to the up-down direction of the case 12. The cartridge memory M is formed in a substantially rectangular flat plate shape in which a longitudinal direction of the cartridge memory M is set in parallel with the right-left direction of the case 12. In other words, the cartridge memory M is formed in a substantially rectangular shape in plan view. The cartridge memory M has an integrated circuit (IC) chip (not shown) in which various kinds of information, such as a recording capacity and a recording format, are stored, and an antenna (not shown) that receives a magnetic field emitted from a noncontact reading and writing device (not shown) provided in the magnetic tape drive. As an example, the antenna is provided on the lower surface of the cartridge memory M.

As shown in FIG. 2 as an example, support ribs 100 are provided on the inner surface of the bottom plate 16A of the lower case 16 and on the rear wall 12D side. As an example, a pair of support ribs 100 is provided on the inner surface of the bottom plate 16A at an interval in the right-left direction of the case 12. The support ribs 100 protrude from the inner surface of the bottom plate 16A upward of the case 12. The support ribs 100 extends toward the peripheral wall 16B corresponding to the rear wall 12D and is connected to the peripheral wall 16B. The support ribs 100 are formed in a substantially right angled triangular shape in side view. The support ribs 100 support the cartridge memory M with support surfaces 100A as inclined surfaces.

Position restricting ribs 104 are provided at an interval in the right-left direction of the case 12 in front of the support ribs 100 in the case 12 on the inner surface of the bottom plate 16A. As an example, a pair of position restricting ribs 104 is provided on the inner surface of the bottom plate 16A. The position restricting ribs 104 support a lower end portion of the cartridge memory M, thereby restricting a position of the lower end portion.

A position restricting rib 106 is provided on the left side of the support ribs 100 in the case 12 on the inner surface of the bottom plate 16A. The position restricting rib 106 protrudes from the inner surface of the bottom plate 16A upward of the case 12, and supports a left end portion of the cartridge memory M, thereby restricting a position of the left end portion.

A position restricting rib 108 is provided on the right side of the support ribs 100 in the case 12 on the inner surface of the bottom plate 16A. The position restricting rib 108 protrudes from the inner surface of the bottom plate 16A upward of the case 12, and supports a right end portion of the cartridge memory M, thereby restricting a position of the right end portion.

As shown in FIG. 3 as an example, holding ribs 102 are provided on the inner surface of the top plate 14A of the upper case 14 and on the rear wall 12D side. As an example, a pair of holding ribs 102 is provided on the inner surface of the bottom plate 16A at an interval in the right-left direction of the case 12. The holding ribs 102 protrude from the inner surface of the top plate 14A downward in the case 12, and press the cartridge memory M from above the case 12 to restrict a position of the cartridge memory M.

Next, the configuration of the door 50 and a peripheral portion of the door 50 will be further described in detail.

Figure 5:
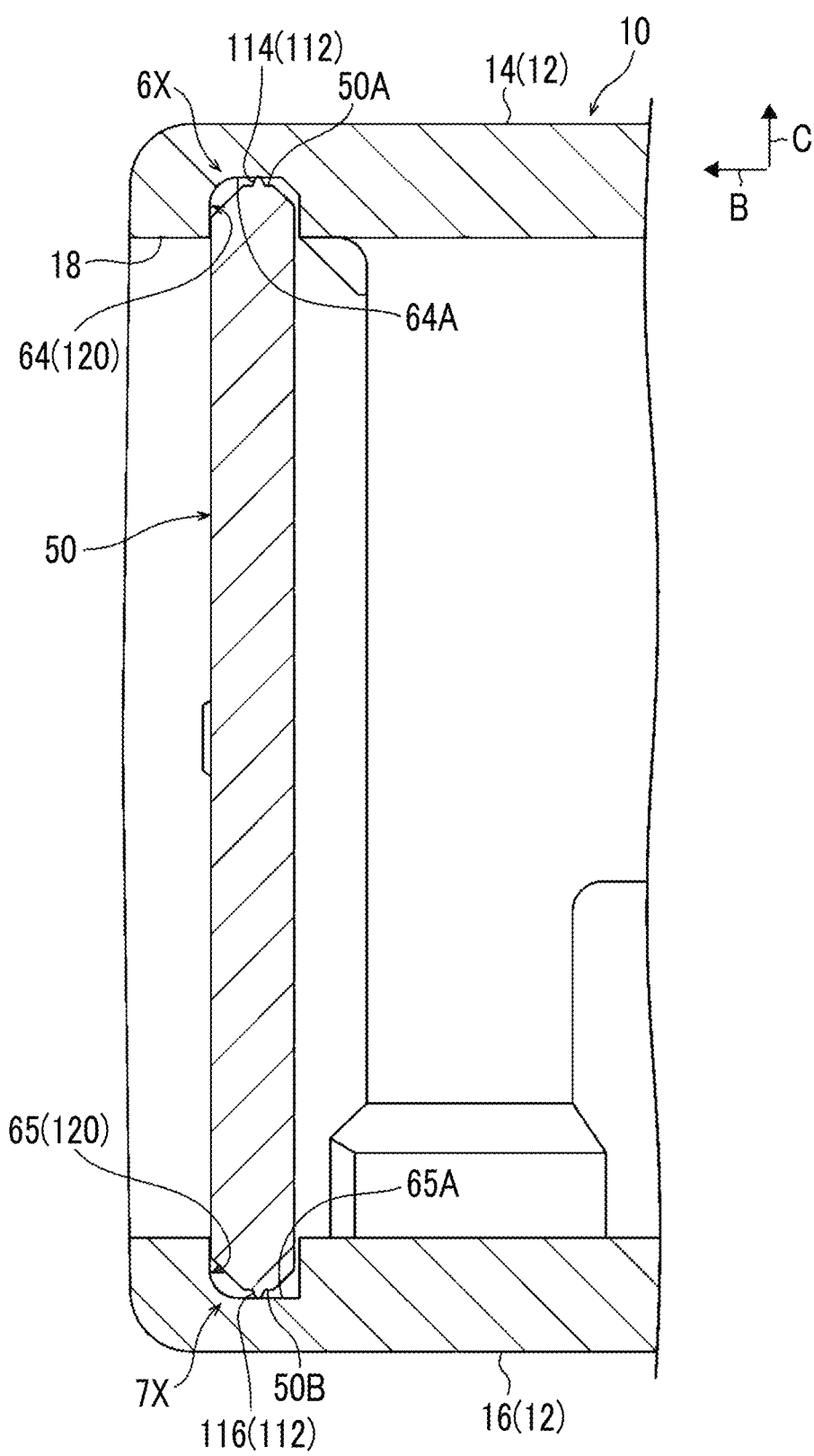
FIG. 5 is a sectional view taken along the line 5X-5X of FIG. 4.
Figure 6:
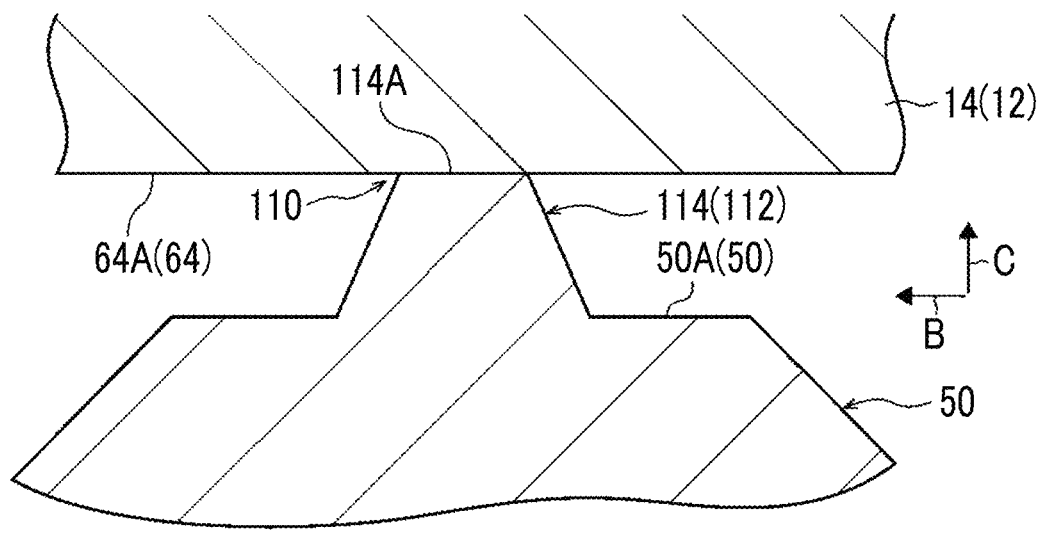
FIG. 6 is an enlarged view of a portion indicated by an arrow 6X in FIG. 5.
Figure 7:
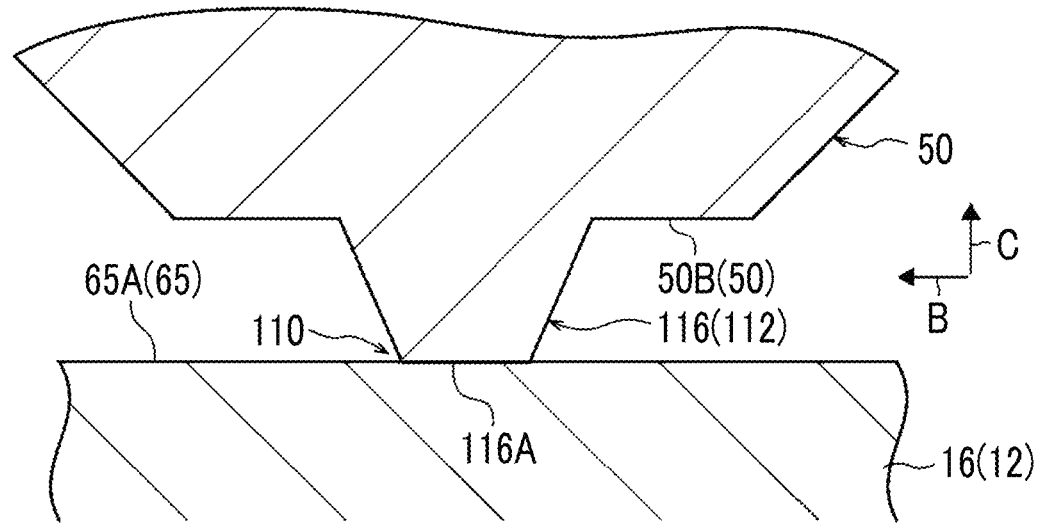
FIG. 7 is an enlarged view of a portion indicated by an arrow 7X in FIG. 5.

As shown in FIG. 4 as an example, the magnetic tape cartridge 10 has the above-described case 12 and the above-described door 50. Here, FIG. 4 is an enlarged view of the periphery of the door 50 of the magnetic tape cartridge 10. A sectional view of the door 50 shown in FIG. 4 is shown in FIG. 5 as an example. An enlarged view of an upper end portion of the door 50 shown in FIG. 5 is shown in FIG. 6. An enlarged view of a lower end portion of the door 50 shown in FIG. 5 is shown in FIG. 7. As shown in FIGS. 6 and 7 as an example, the magnetic tape cartridge 10 has fixing portions 110 that fix the door 50 to the case 12. Examples of fixing include ultrasonic welding, thermal welding, and bonding. That is, the fixing portions 110 may be any one of ultrasonic welding portions, terminal welding portions, or bonding portions.

As shown in FIGS. 6 and 7 as an example, the fixing portions 110 include protrusions 112. The protrusions 112 are formed in the door 50. Distal ends of the protrusions 112 are fixed to the case 12. As an example, the protrusions 112 are fixed to the case 12 by being welded to the case 12. In the embodiment, the protrusions 112 are fixed to the case 12 by ultrasonic welding. Accordingly, the protrusions 112 are welded to the case 12 through the fixing portions 110 as ultrasonic welding portions. The protrusions 112 of the embodiment are a so-called energy director. The energy director is a place where energy of ultrasonic waves concentrates.

As shown in FIGS. 6 and 7 as an example, the protrusions 112 are provided on the first surface 50A and the second surface 50B of the door 50, respectively. Hereinafter, the protrusion 112 provided on the first surface 50A is referred to as an upper protrusion 114. The protrusion 112 provided on the second surface 50B is referred to as a lower protrusion 116. That is, the fixing portions 110 have the upper protrusion 114 provided on the first surface 50A and the lower protrusion 116 provided on the second surface 50B. The upper protrusion 114 is an example of a "first protrusion" according to the technique of the present disclosure. The lower protrusion 116 is an example of a "second protrusion" according to the technique of the present disclosure.

As shown in FIG. 6 as an example, the upper protrusion 114 is welded to the bottom surface 64A of the groove 64. As an example, a distal end 114A side of the upper protrusion 114 is welded to a center portion in a groove width direction of the bottom surface 64A by the ultrasonic welding (see FIG. 5). The groove width direction of the groove 64 in the embodiment corresponds to the right-left direction of the case 12.

Figure 15:
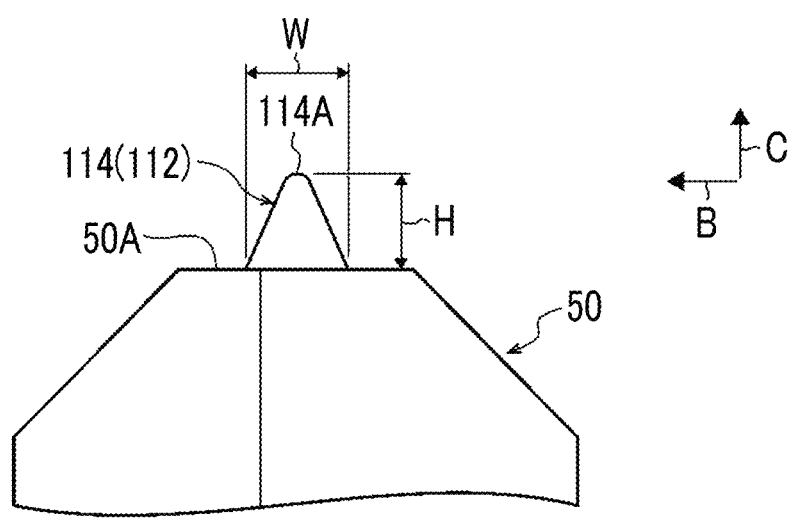
FIG. 15 is a front view of a protrusion shown in FIG. 14 as viewed from a front side.

As shown in FIG. 6 as an example, the upper protrusion 114 is formed in a shape in which a cross-sectional area is reduced from a proximal end side toward the distal end 114A side. As an example, the upper protrusion 114 has a shape in which a width dimension is reduced toward the distal end 114A side. The "protrusion width dimension" means the dimension between both side surfaces of the protrusion. In the upper protrusion 114 of the embodiment, a cross-sectional shape in a direction perpendicular to an extension direction of the upper protrusion 114 has a trapezoidal shape. The direction perpendicular to the extension direction of the upper protrusion 114 in the embodiment corresponds to the right-left direction of the case 12. As shown in FIG. 6 as an example, in a case where the upper protrusion 114 is welded to the upper case 14, the distal end 114A is crushed and has a flat shape. On the other hand, as shown in FIG. 15 as an example, in the upper protrusion 114 before welding, the distal end 114A is curved in an arc shape. The technique of the present disclosure is not limited thereto. The shape of the distal end 114A of the upper protrusion 114 before welding may be planar or sharp. Here, the term "planar" indicates planar in a meaning including an error that is generally allowed in the technical field to which the technique of the present disclosure belongs, and an error to such an extent not contrary to the spirit and scope of the technique of that the present disclosure, in addition to completely planar.

Figure 8:
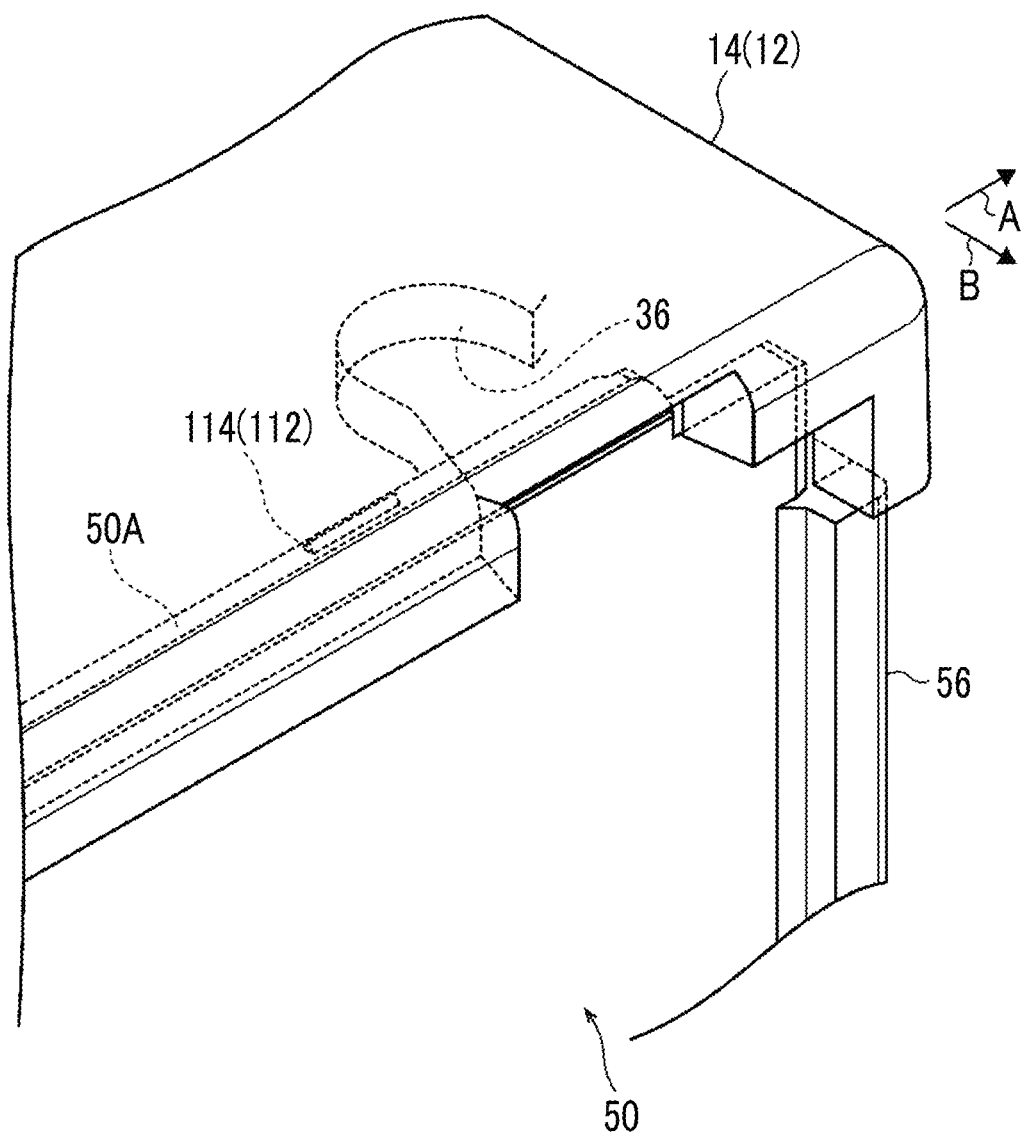
FIG. 8 is an enlarged perspective view of a portion indicated by an arrow 8X in FIG. 4.
Figure 10:
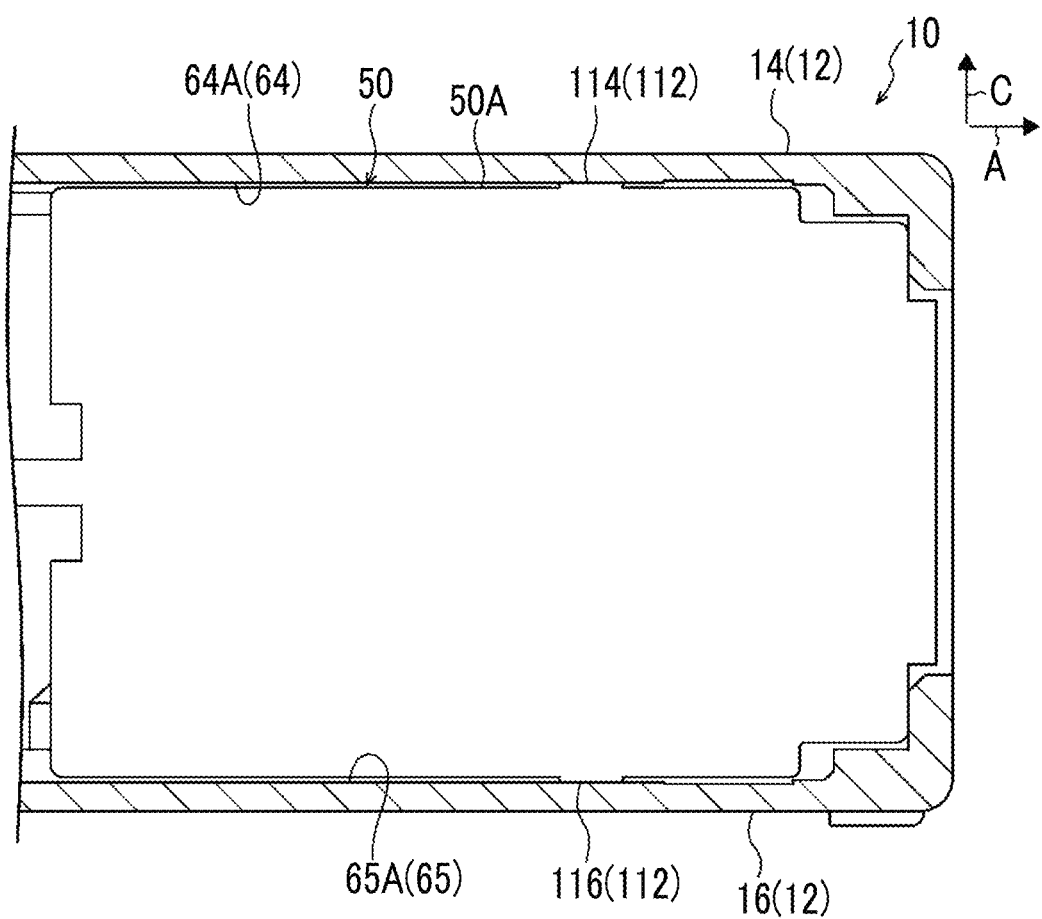
FIG. 10 is a sectional side view of the periphery of the door of the magnetic tape cartridge in FIG. 1.

As shown in FIGS. 8 and 10 as an example, the upper protrusion 114 is provided on an end portion side in a closing direction of the door 50 on the first surface 50A. The closing direction of the door 50 in the embodiment corresponds to a direction in front of the case 12. That is, the upper protrusion 114 is provided on a front side of the case 12 and on a rear side of the case 12 from the pin holding portion 36 on the first surface 50A (see FIG. 8). The upper protrusion 114 is provided in a center portion in a thickness direction of the door 50 on the first surface 50A (see FIG. 5). The thickness direction of the door 50 in the embodiment corresponds to the right-left direction of the case 12.

Figure 11:
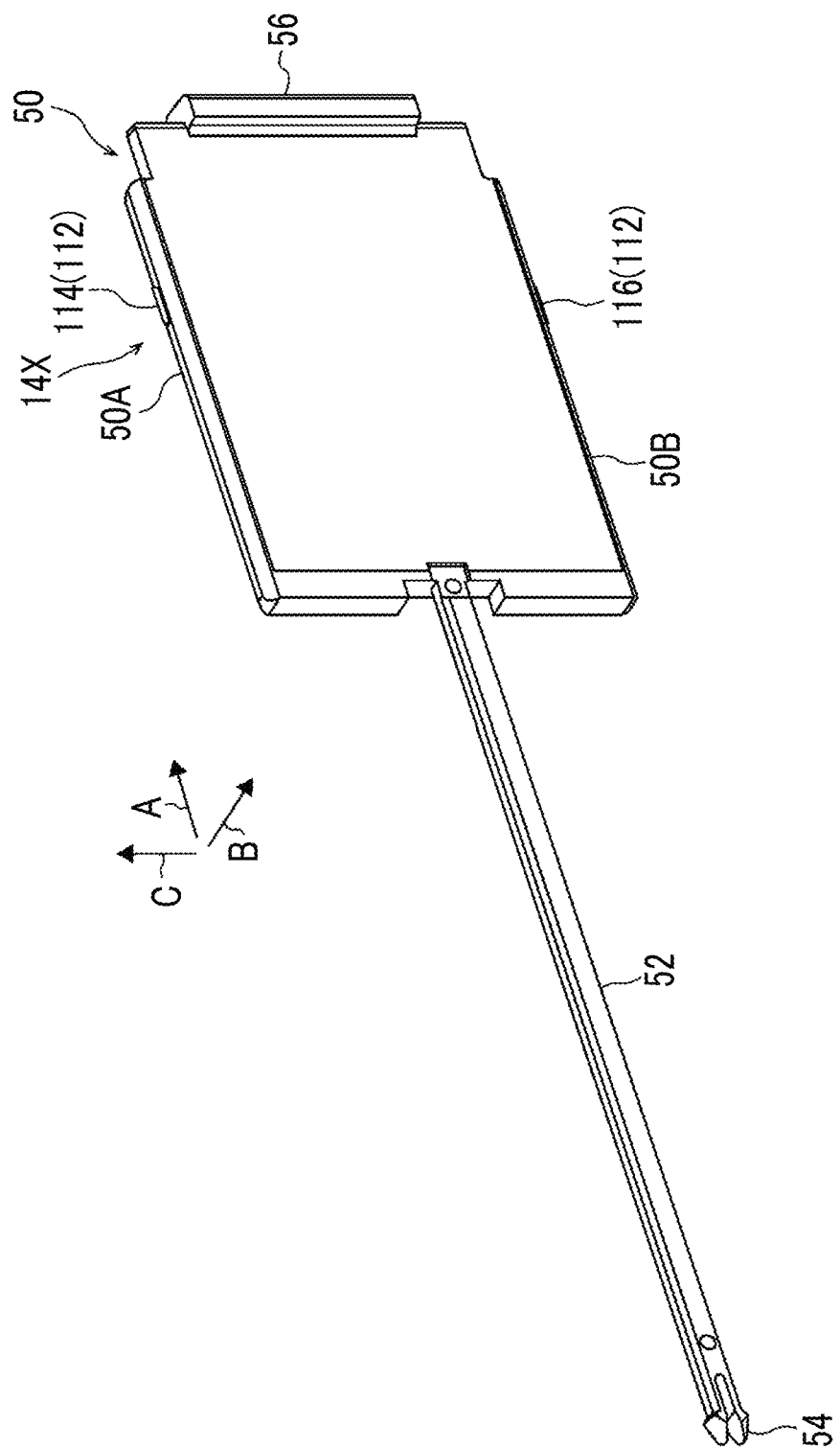
FIG. 11 is a perspective view of the door that is used in the magnetic tape cartridge of FIG. 1.

As shown in FIGS. 10 and 11 as an example, the upper protrusion 114 is an elongated protrusion that extends in the front-rear direction of the case 12 along the first surface 50A.

As shown in FIG. 7 as an example, the lower protrusion 116 is welded to the bottom surface 65A of the groove 65. As an example, a distal end 116A side of the lower protrusion 116 is welded to a center portion in a groove width direction of the bottom surface 65A by ultrasonic welding (see FIG. 5). The groove width direction of the groove 65 in the embodiment corresponds to the right-left direction of the case 12.

As shown in FIG. 7 as an example, the lower protrusion 116 has a shape in which a cross-sectional area is reduced from a proximal end side toward the distal end 116A side. As an example, the lower protrusion 116 has a shape in which a width dimension is reduced toward the distal end side. In the lower protrusion 116 of the embodiment, a cross-sectional area in a direction perpendicular to an extension direction of the lower protrusion 116 has a trapezoidal shape. The direction perpendicular to the extension direction of the lower protrusion 116 in the embodiment corresponds to the right-left direction of the case 12. As shown in FIG. 7 as an example, in a case where the lower protrusion 116 is welded to the lower case 16, the distal end 116A is crushed and has a flat shape; however, in the lower protrusion 116 before welding, similarly to the upper protrusion 114, the distal end 116A is curved in an arc shape. The technique of the present disclosure is not limited thereto. The shape of the distal end 116A of the lower protrusion 116 before welding may be planar or sharp.

Figure 9:
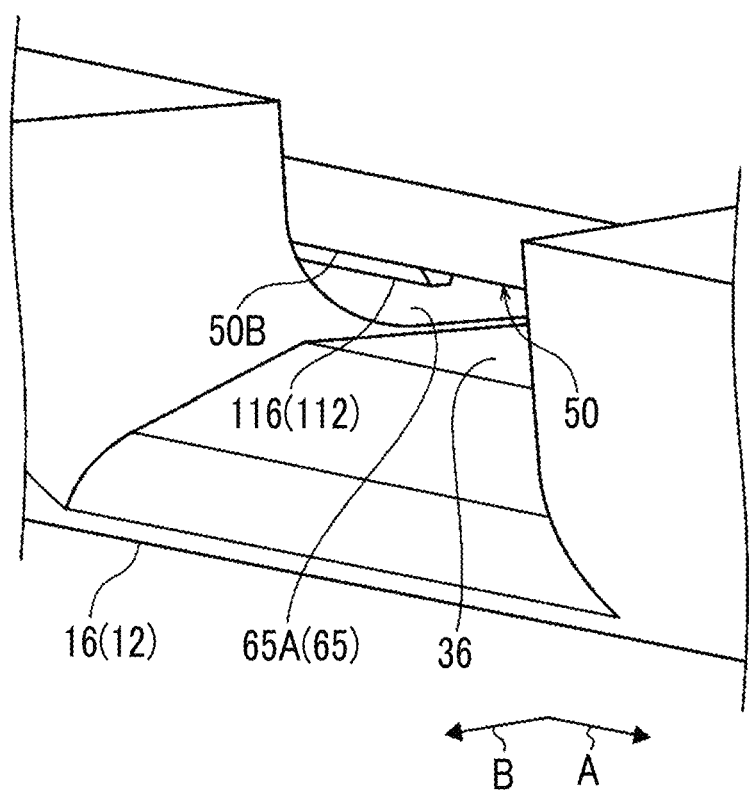
FIG. 9 is an enlarged perspective view of a portion indicated by an arrow 9X in FIG. 4.

As shown in FIGS. 9 and 10 as an example, the lower protrusion 116 is provided on an end portion side in the closing direction of the door 50 on the second surface 50B. As an example, the lower protrusion 116 is provided on a front side of the case 12 and on a rear side of the case 12 from the pin holding portion 36 on the second surface 50B (see FIG. 9). The lower protrusion 116 is provided in a center portion in the thickness direction of the door 50 on the second surface 50B (see FIG. 5).

As shown in FIG. 10 as an example, the lower protrusion 116 is an elongated protrusion extending in the front-rear direction of the case 12 along the second surface 50B.

As shown in FIG. 10 as an example, the upper protrusion 114 is provided at a position on an opposite side to the lower protrusion 116 in the up-down direction of the door 50 with respect to the case 12. As an example, the upper protrusion 114 and the lower protrusion 116 are disposed at identical positions in the front-rear direction of the case 12. Here, the term "identical" indicates identical in a meaning including an error that is generally allowed in the technical field to which the technique of the present disclosure belongs, and an error to such an extent not contrary to the spirit and scope of the technique of the present disclosure, in addition to completely identical.

In the embodiment, the upper protrusion 114 and the lower protrusion 116 have the same shape. Here, the term "same" indicates same in a meaning including an error that is generally allowed in the technical field to which the technique of the present disclosure belongs, and an error to such an extent not contrary to the spirit and scope of the technique of the present disclosure, in addition to completely same.

In the embodiment, it is preferable that a width dimension W of the upper protrusion 114 before the door 50 is welded to the case 12 is equal to or greater than 0.5 mm and equal to or less than 1.0 mm. It is preferable that a length dimension L of the upper protrusion 114 is equal to or greater than 0.5 mm and equal to or less than 2.0 mm. The length dimension of the upper protrusion 114 in the embodiment is the length dimension along the front-rear direction of the case 12. A range of each of the width dimension and the length dimension of the lower protrusion 116 is similar to a range of each of the width dimension and the length dimension of the upper protrusion 114.

As shown in FIGS. 12 to 15 as an example, in a case where a vertical dimension UD of the door 50 is set to 19.4 mm, a horizontal dimension FR of the door 50 is set to 27.9 mm, and a thickness dimension T of the door 50 is set to 1.4 mm, a height dimension H (see FIG. 15) of the upper protrusion 114 may be set to 0.2 mm, the length dimension L (see FIG. 14) may be set to 1.6 mm, and the width dimension W (see FIG. 15) may be set to 0.2 mm. Here, the vertical dimension UD (see FIG. 12) of the door 50 is the dimension of the door 50 along the up-down direction of the case 12. The horizontal dimension FR (see FIG. 12) of the door 50 is the dimension of the door 50 along the front-rear direction of the case 12. The thickness dimension T (see FIG. 13) of the door 50 is the dimension of the door 50 along the right-left direction of the case 12. The respective dimensions of the lower protrusion 116 may be set to dimensions identical to as the respective dimensions of the upper protrusion 114.

Figure 16:
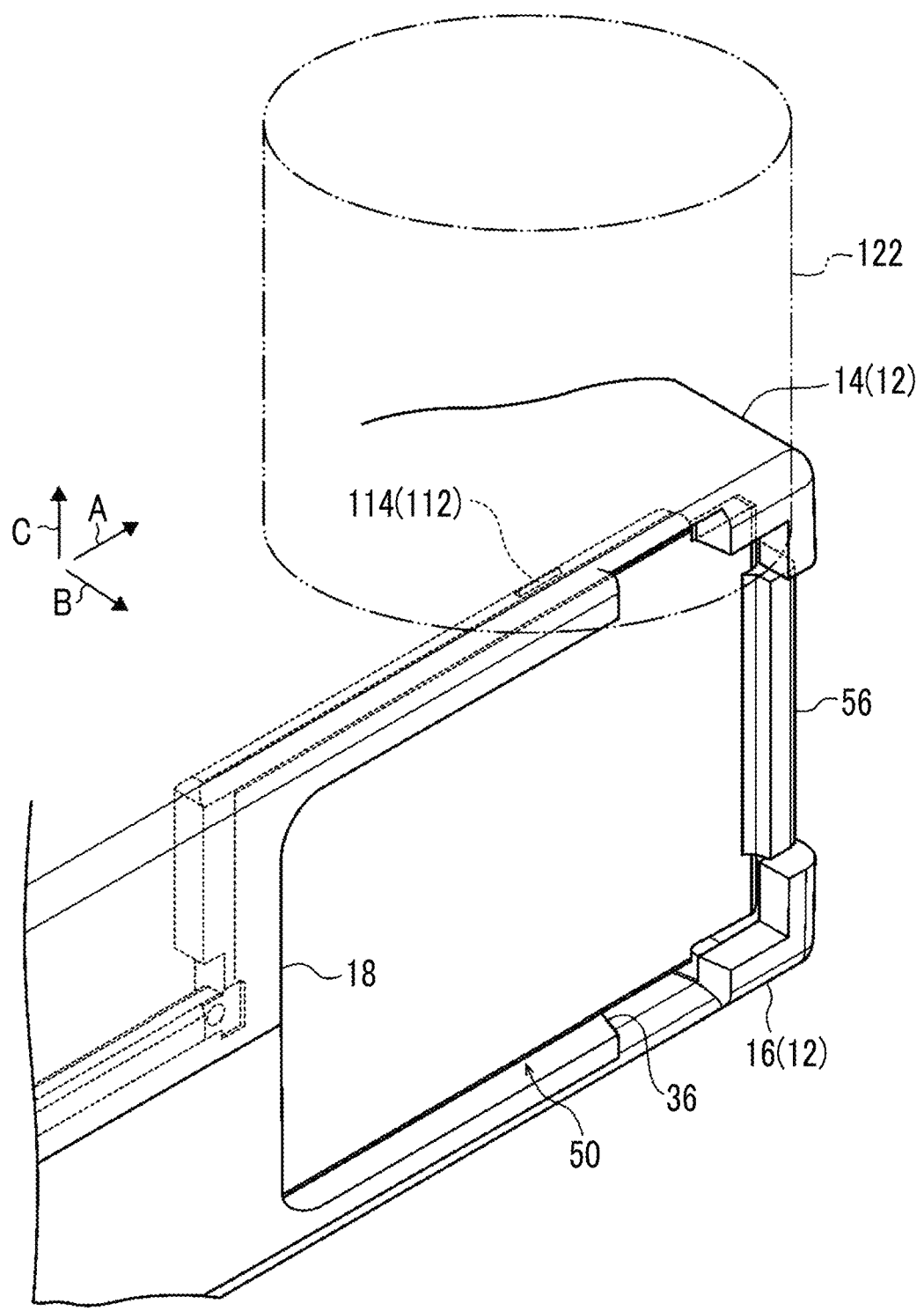
FIG. 16 is an enlarged perspective view of the periphery of the door showing a method of manufacturing the magnetic tape cartridge of FIG. 1.
Figure 17:
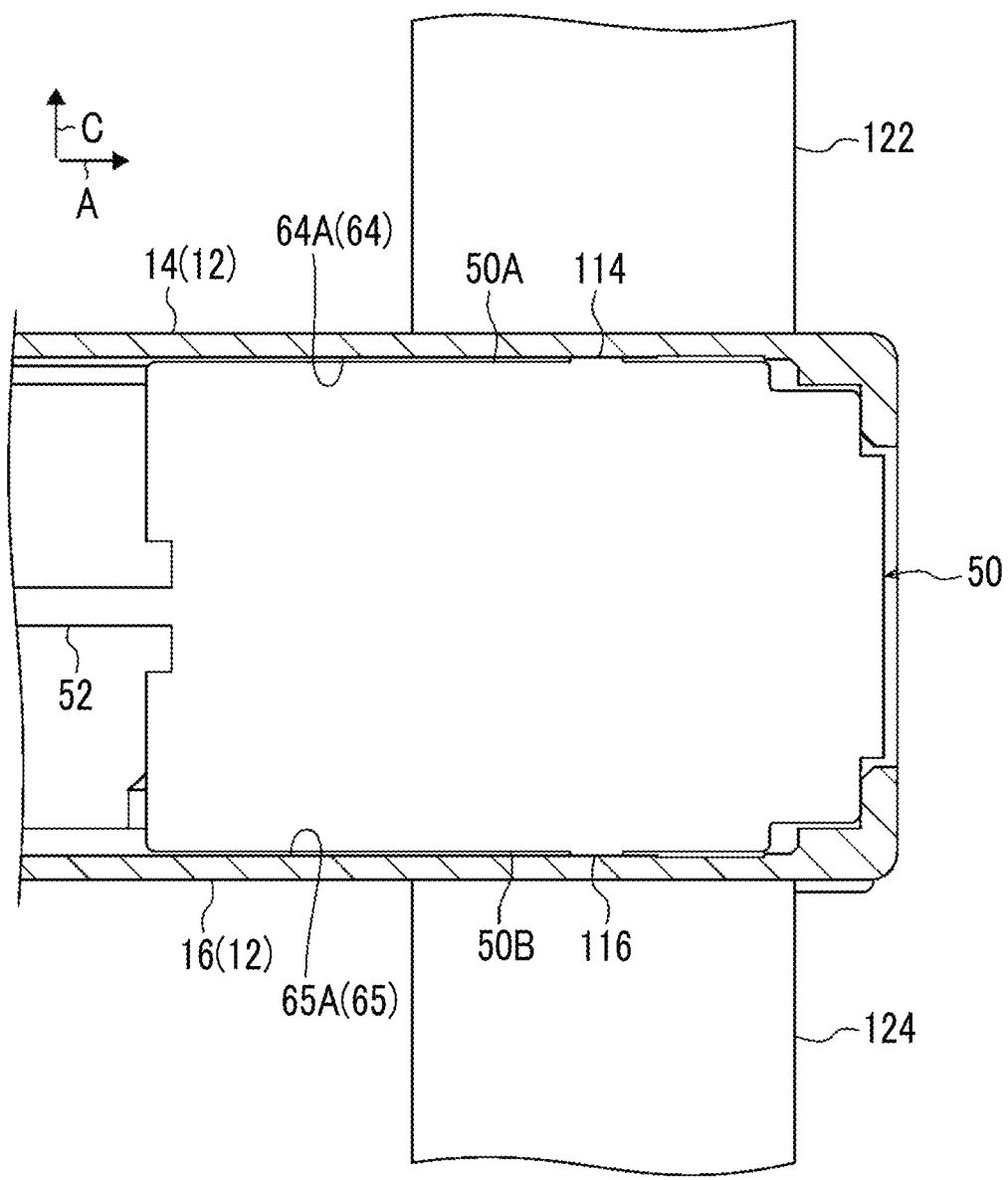
FIG. 17 is a sectional side view of the periphery of the door of the magnetic tape cartridge of FIG. 16.

Next, a method of manufacturing the magnetic tape cartridge 10 will be described referring to FIGS. 16 and 17.

First, constituent components including the door 50 of the magnetic tape cartridge 10 are assembled to the case 12 having the opening 18. Next, the door 50 is made to slide to open the opening 18. Then, the magnetic tape MT is housed in the case 12 through the opening 18. After the magnetic tape MT is housed, the opening 18 of the case 12 is closed by the door 50.

Next, the door 50 is fixed to the case 12. Here, the fixing of the door 50 to the case 12 includes fixing the upper protrusion 114 and the lower protrusion 116 formed in the door 50 to the case 12 by ultrasonic welding. In the embodiment, as shown in FIGS. 16 and 17 as an example, the upper protrusion 114 and the lower protrusion 116 formed in the door 50 are fixed to the case 12 by ultrasonic welding. Ultrasonic welding will be described in detail. First, a portion of the case 12 corresponding to the door 50 is sandwiched by a horn 122 and a support 124 for ultrasonic welding. As an example, in a state in which a portion of the lower case 16 corresponding to the door 50 is supported by the support 124, a portion of the upper case 14 corresponding to the door 50 is pressurized by the horn 122. With this, the door 50 is pressurized in the up-down direction of the case 12 through the upper case 14 and the lower case 16. In a pressurized state by the horn 122 and the support 124, the distal end 114A of the upper protrusion 114 of the door 50 is pressed against the bottom surface 64A of the groove 64. The distal end 116A of the lower protrusion 116 of the door 50 is pressed against the bottom surface 65A of the groove 65.

Thereafter, ultrasonic vibration is applied from the horn 122 to the case 12 while maintaining the pressurized state of the door 50 by the horn 122 and the support 124. In a case where ultrasonic vibration is applied to the case 12, a contact portion of the distal end 114A of the upper protrusion 114 of the door 50 and the bottom surface 64A of the groove 64 (as an example, a contact surface of the distal end 114A and the bottom surface 64A) generates heat by friction, and the distal end 114A of the upper protrusion 114 and the bottom surface 64A of the groove 64 are welded. A contact portion of the distal end 116A of the lower protrusion 116 of the door 50 and the bottom surface 65A of the groove 65 (as an example, a contact surface of the distal end 116A and the bottom surface 65A) generates heat by friction, and the distal end 116A of the lower protrusion 116 and the bottom surface 65A of the groove 65 are welded.

In a case where the door 50 is welded to the case 12, assembling of the magnetic tape cartridge 10 is completed.

Next, a loading operation of the magnetic tape cartridge 10 into the magnetic tape drive will be described.

The magnetic tape cartridge 10 is loaded into the magnetic tape drive with the front wall 12A as the head. At the time of loading, force of the rear side in the case 12 is applied to the door 50 brought into contact with an opening member of the magnetic tape drive, and the fixing portions 110 are broken. In a case where the fixing portions 110 are broken, the door 50 slides to the rear side in the case 12, and the opening 18 is opened. The positioning members of the magnetic tape drive are relatively inserted into the reference hole 32 and the reference hole 34, respectively.

Then, the positioning surfaces of the magnetic tape drive are relatively brought into contact with the reference surface 33, the reference surface 35, the reference surface 37, and the reference surface 39, respectively, whereby a front-rear direction, a right-left direction, and an up-down direction of the magnetic tape cartridge 10 are positioned in the magnetic tape drive.

The rotating shaft of the magnetic tape drive relatively enters from the gear opening 40, and the drive gear meshes with the reel gear 44. The leg portions 94 protruding over the reel gear 44 are pushed up against the biasing force of the compression coil spring 98 involving an operation of the drive gear meshing with the reel gear 44, the braking member 80 is pushed upward through the release member 90, and the meshing of the braking gear 84 and the engaging gear 48 is released.

Then, in a state in which the drive gear and the reel gear 44 completely mesh with each other, the reel plate 46 is stuck and held by the magnetic force of the annular magnet provided inside the drive gear. With this, the cartridge reel 20 is brought into an unlocked state to be relatively rotatable in the case 12 with respect to the case 12 while the meshing of the reel gear 44 with the drive gear is maintained.

In recording data on the magnetic tape MT or reproducing data of the magnetic tape MT, the lead-out member (not shown) provided in the magnetic tape drive enters the case 12 from the opened opening 18 and grasps and leads out the leader pin 30 positioned and held in the pin holding portions 36. In this case, since the rotation-locked state is released, the cartridge reel 20 can rotate involving a lead-out operation of the leader pin 30.

Next, the operations of the magnetic tape cartridge 10 will be described.

In the magnetic tape cartridge 10, the case 12 and the door 50 are fixed through the fixing portions 110. For this reason, in a case where the magnetic tape cartridge 10 is an unused item, there is a need to break the fixing portions 110 to open the door 50. Here, in a case where the fixing portions 110 are broken, it is possible to identify that the magnetic tape cartridge 10 is not an unused item, based on the trace of the breakage. On the other hand, in a case where the fixing portions 110 are not broken, since there is no trace of the breakage of the fixing portions 110, it is possible to identify that the magnetic tape cartridge 10 is an unused item. Accordingly, with the configuration, it is possible to identify whether or not the magnetic tape cartridge 10 is an unused item, based on the trace of the breakage of the fixing portions 110 compared to a case where the magnetic tape cartridge 10 does not have the fixing portions 110, for example.

In the magnetic tape cartridge 10, the upper protrusion 114 and the lower protrusion 116 formed in the door 50 are fixed to the case 12. Accordingly, with the configuration, force necessary for breaking the fixing portions 110 is small compared to a configuration in which the fixing portions fix the whole periphery of the door 50 to the case 12, for example.

For example, in a case where the upper protrusion 114 and the lower protrusion 116 are bonded to the case 12 by an adhesive material, the adhesive material is likely to influence the magnetic tape MT and/or the cartridge reel 20. For this reason, in the magnetic tape cartridge 10, the upper protrusion 114 and the lower protrusion 116 are welded to the case 12. Accordingly, with the configuration, since the adhesive material can be made unnecessary, it is possible to restrain the adhesive material from influencing the magnetic tape MT and/or the cartridge reel 20.

For example, in a case where the upper protrusion 114 and the lower protrusion 116 are welded to the case 12 by thermal welding, heat is likely to influence the magnetic tape MT and/or the cartridge reel 20. For this reason, in the magnetic tape cartridge 10, the upper protrusion 114 and the lower protrusion 116 are welded to the case 12 through the ultrasonic welding portion. Accordingly, with the configuration, it is possible to reduce the influence of heat on the magnetic tape MT and/or the cartridge reel 20 compared to a case where the upper protrusion 114 and the lower protrusion 116 are welded to the case 12 by thermal welding.

In the magnetic tape cartridge 10, the upper protrusion 114 is provided on the first surface 50A extending in the front-rear direction of the case 12 in the door 50, and the lower protrusion 116 is provided on the second surface 50B extending in the front-rear direction of the case 12 in the door 50. Accordingly, with the configuration, in a case where the door 50 is moved in the front-rear direction of the case 12, it is possible to break the upper and lower fixing portions 110 with shearing force generated between the upper and lower protrusions 114 and 116 and the case 12.

In the magnetic tape cartridge 10, the upper end portion of the door 50 is housed in the groove 64, and the lower end portion of the door 50 is housed in the groove 65. Accordingly, with the configuration, looseness of the door 50 is suppressed by the groove 64 and the groove 65 compared to a configuration in which the upper end portion and the lower end portion of the door 50 are not housed in the groove 64 and the groove 65, respectively, for example. The looseness of the door 50 is suppressed, whereby force for breaking the fixing portions 110 is easily applied to the fixing portions.

In the magnetic tape cartridge 10, the upper protrusion 114 is provided on the front end portion side on the first surface 50A of the door 50, and the lower protrusion 116 is provided on the front end portion side on the second surface 50B of the door 50. Accordingly, with the configuration, a position where the user applies force to the door 50 in opening the door 50 approaches the positions of the upper protrusion 114 and the lower protrusion 116 compared to a configuration in which the upper protrusion 114 and the lower protrusion 116 are provided on rear end portion sides of the first surface 50A and the second surface 50B, for example. With this, in the magnetic tape cartridge 10, it is possible to easily break the fixing portions 110 of the door 50.

In the magnetic tape cartridge 10, each of the upper protrusion 114 and the lower protrusion 116 is the elongated protrusion extending in the front-rear direction of the case 12. Accordingly, with the configuration, it is possible to secure a fixing area of the upper protrusion 114 and the case 12 and a fixing area of the lower protrusion 116 and the case 12.

In the magnetic tape cartridge 10, each of the upper protrusion 114 and the lower protrusion 116 has a shape in which a cross-sectional area is reduced from a proximal end side toward a distal end side. Accordingly, with the configuration, it is possible to break the fixing portions 110 on the distal end side of the upper protrusion 114 and the distal end side of the lower protrusion 116.

In the magnetic tape cartridge 10, each of the upper protrusion 114 and the lower protrusion 116 has a shape in which a width dimension is reduced toward the distal end side. Accordingly, with the configuration, it is possible to break the fixing portions 110 on the distal end side of the upper protrusion 114 and the distal end side of the lower protrusion 116 while securing the length of each of the upper protrusion 114 and the lower protrusion 116 in the front-rear direction of the case 12.

In the magnetic tape cartridge 10, the upper protrusion 114 provided on the first surface 50A of the door 50 and the lower protrusion 116 provided on the second surface 50B of the door 50 are fixed to the case 12. Accordingly, with the configuration, it is possible to fix the door 50 to the case 12 in good balance in the up-down direction of the case 12 compared to a configuration in which only the upper protrusion 114 or the lower protrusion 116 is provided in the door 50.

In the magnetic tape cartridge 10, the upper protrusion 114 is provided at the position on the opposite side to the lower protrusion 116 in the up-down direction of the case 12. Accordingly, with the configuration, it is possible to fix the door 50 to the case 12 in good balance in the up-down direction of the case 12 compared to a configuration in which the upper protrusion 114 is provided to deviate from the position on the opposite side to the lower protrusion 116 in the up-down direction of the case 12, for example.

In the magnetic tape cartridge 10, the upper protrusion 114 and the lower protrusion 116 have the same shape. Accordingly, with the configuration, in the magnetic tape cartridge 10, it is possible to fix the door 50 to the case 12 in good balance in the up-down direction of the case 12 compared to a configuration in which the shape of the upper protrusion 114 and the shape of the lower protrusion 116 are different, for example.

Figure 18:
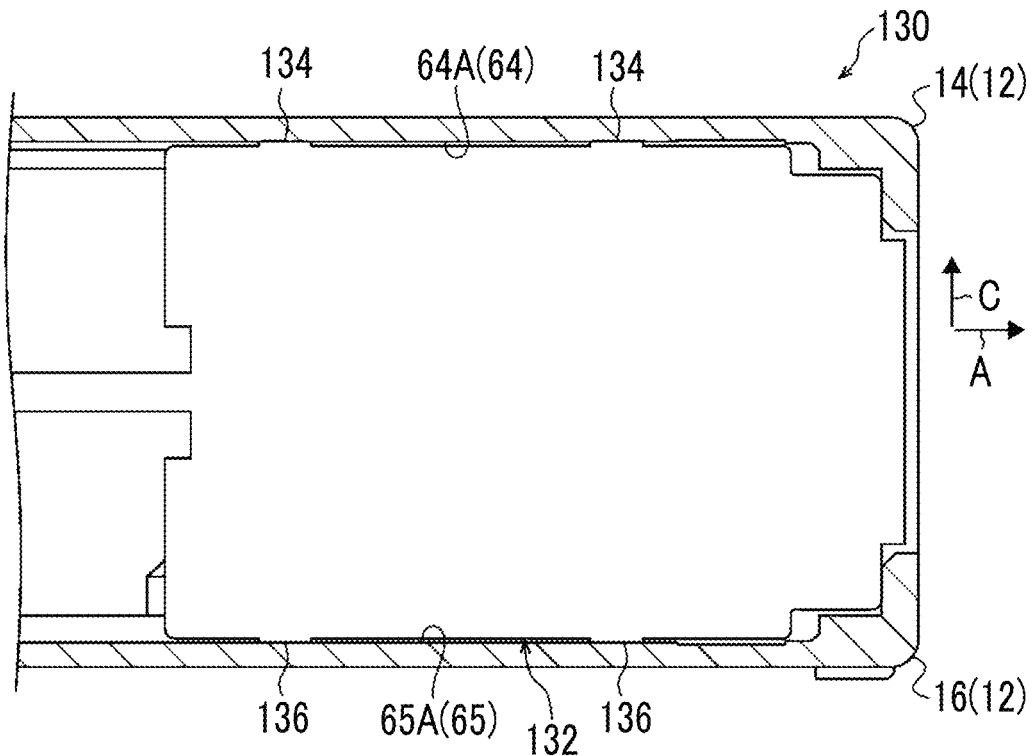
FIG. 18 is a sectional side view of the periphery of a door of a magnetic tape cartridge of a modification example.

In the above-described embodiment, although one upper protrusion 114 is provided on the first surface 50A of the door 50, and one lower protrusion 116 is provided on the second surface 50B, the technique of the present disclosure is not limited thereto. For example, like a magnetic tape cartridge 130 shown in FIG. 18, a plurality of upper protrusions 134 may be provided on a first surface 132A of a door 132, and a plurality of lower protrusions 136 may be provided on a second surface 132B. Here, the magnetic tape cartridge 130 has a configuration similar to the magnetic tape cartridge 10 except for the number of upper protrusions 134 and the number of lower protrusions 136. Accordingly, the magnetic tape cartridge 130 can obtain operations similar to the magnetic tape cartridge 10. The upper protrusion 134 is an example of a "first protrusion" according to the technique of the present disclosure. The lower protrusion 136 is an example of a "second protrusion" according to the technique of the present disclosure.

Figure 19:
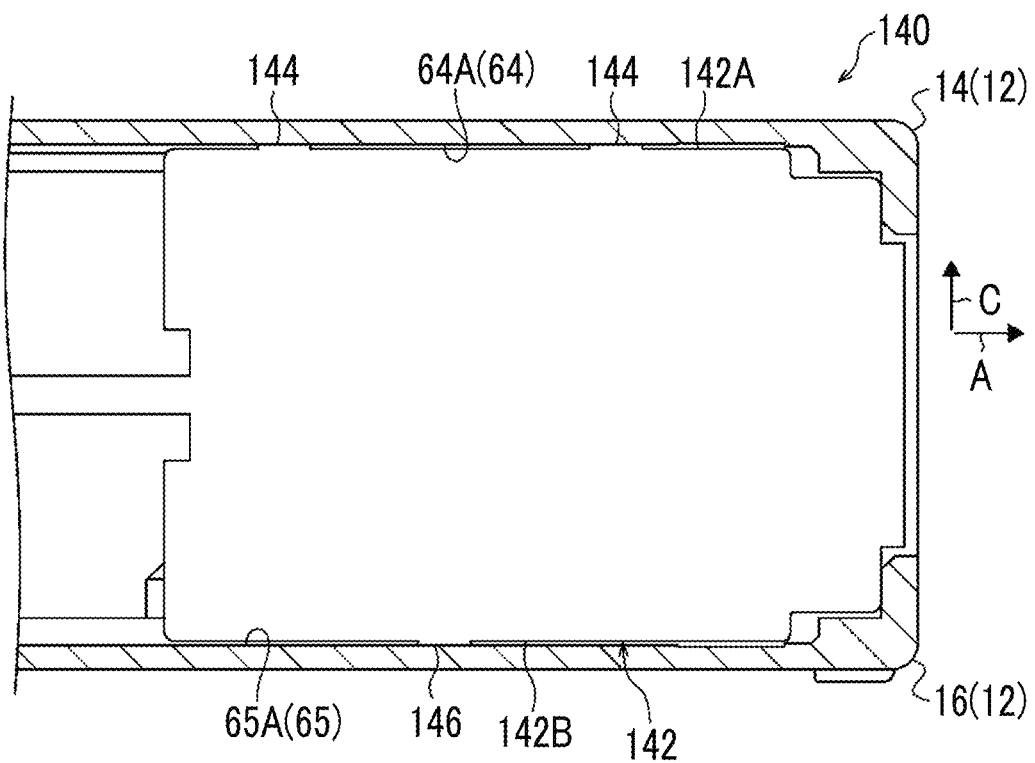
FIG. 19 is a sectional side view of the periphery of a door of a magnetic tape cartridge of a modification example.

In the above-described embodiment, although the number of upper protrusions 114 provided on the first surface 50A of the door 50 is identical to the number of lower protrusions 116 provided on the second surface 50B, the technique of the present disclosure is not limited thereto, and the number of upper protrusions 114 provided on the first surface 50A of the door 50 may be different from the number of lower protrusions 116 provided on the second surface 50B. For example, like a magnetic tape cartridge 140 shown in FIG. 19, a plurality of upper protrusions 144 may be provided on a first surface 142A of a door 142, and a smaller number of lower protrusions 146 than the number of upper protrusions 144 may be provided on the second surface 142B. In FIG. 19 as an example, two upper protrusions 144 are provided in the door 142, and one lower protrusion 146 is provided in the door 142. The number of lower protrusions 146 may be set to be greater than the number of upper protrusions 144 in the door 142. The magnetic tape cartridge 140 has a configuration similar to the magnetic tape cartridge 10 except for a configuration in which the number of upper protrusions 144 is different from the number of lower protrusions 146. Accordingly, the magnetic tape cartridge 140 can obtain operations similar to the magnetic tape cartridge 10. The upper protrusion 144 is an example of a "first protrusion" according to the technique of the present disclosure. The lower protrusion 146 is an example of a "second protrusion" according to the technique of the present disclosure.

Figure 20:
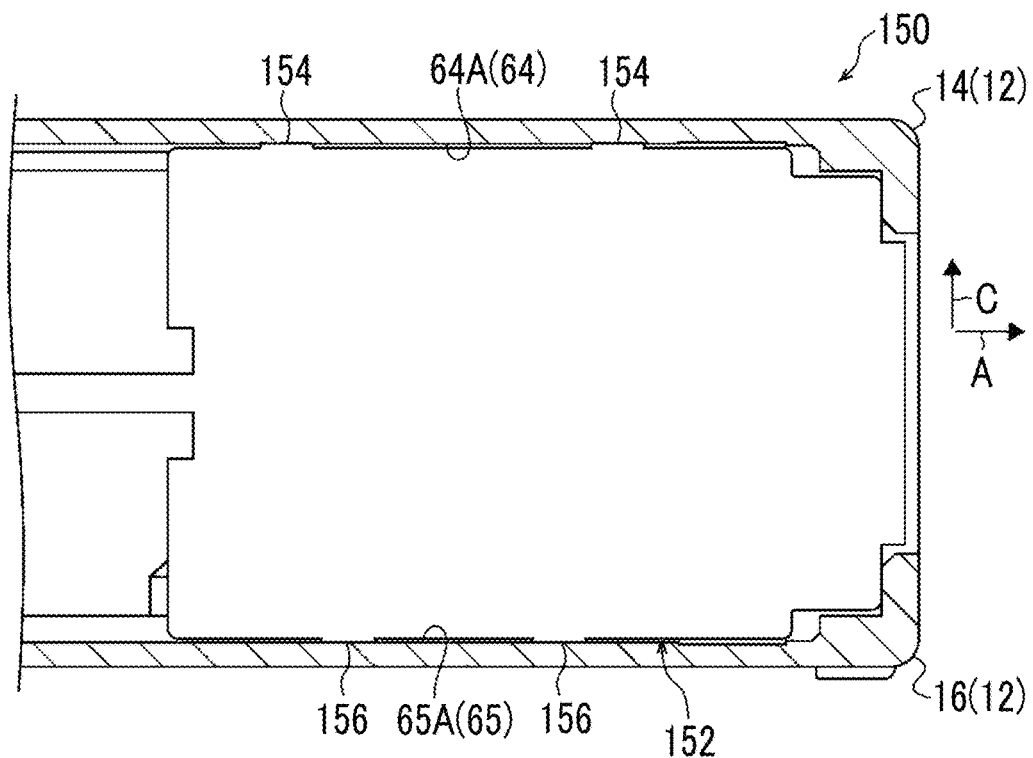
FIG. 20 is a sectional side view of the periphery of a door of a magnetic tape cartridge of a modification example.

In the above-described embodiment, although the positions of the upper protrusion 114 and the lower protrusion 116 in the door 50 in the front-rear direction of the case 12 are identical positions, the technique of the present disclosure is not limited thereto. For example, like a magnetic tape cartridge 150 shown in FIG. 20, positions of an upper protrusion 154 and a lower protrusion 156 in a door 152 in the front-rear direction of the case 12 may deviate from each other. The magnetic tape cartridge 150 has a configuration similar to the magnetic tape cartridge 10 except that the positions of the upper protrusion 114 and the lower protrusion 116 in the front-rear direction of the case 12 are identical positions. Accordingly, the magnetic tape cartridge 150 can obtain operations similar to the magnetic tape cartridge 10 except for operations obtained in a case where the positions of the upper protrusion 114 and the lower protrusion 116 in the front-rear direction of the case 12 are identical positions. The upper protrusion 154 is an example of a "first protrusion" according to the technique of the present disclosure. The lower protrusion 156 is an example of a "second protrusion" according to the technique of the present disclosure.

Figure 21:
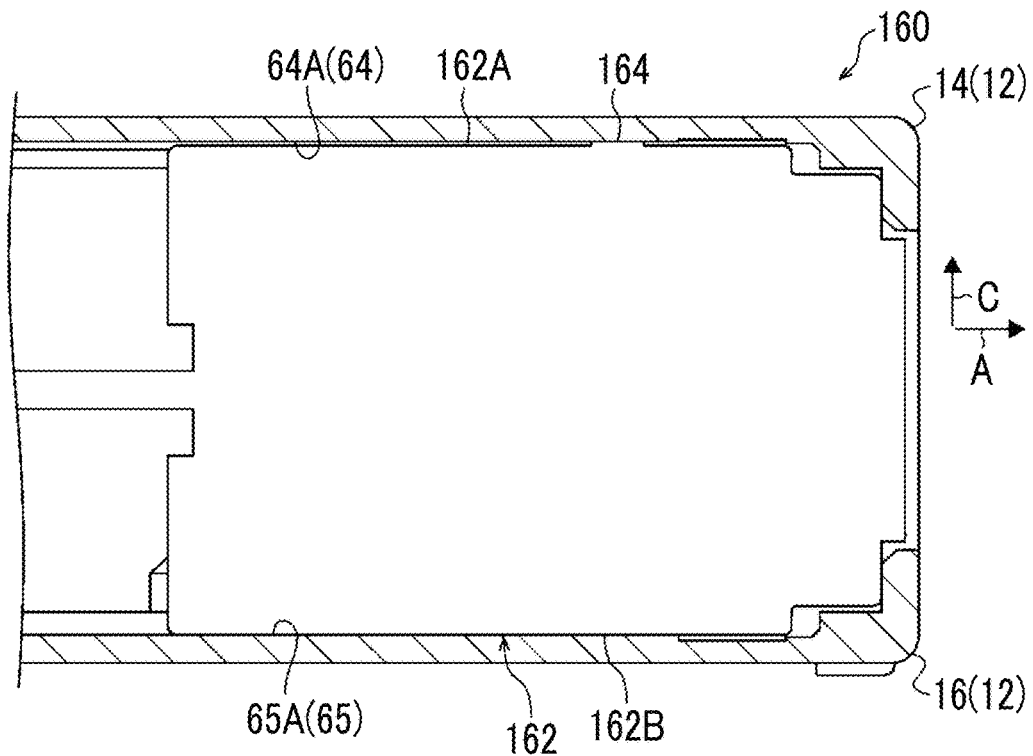
FIG. 21 is a sectional side view of the periphery of a door of a magnetic tape cartridge of a modification example.

In the above-described embodiment, although the upper protrusion 114 provided on the first surface 50A of the door 50 is welded to the upper case 14, and the lower protrusion 116 provided on the second surface 50B is welded to the lower case 16, the technique of the present disclosure is not limited thereto. For example, like a magnetic tape cartridge 160 shown in FIG. 21, an upper protrusion 164 provided on a first surface 162A of a door 162 may be welded to the upper case 14, and a second surface 162B may be welded directly to the lower case 16. The upper protrusion 164 is an example of a "protrusion" according to the technique of the present disclosure.

Figure 22:
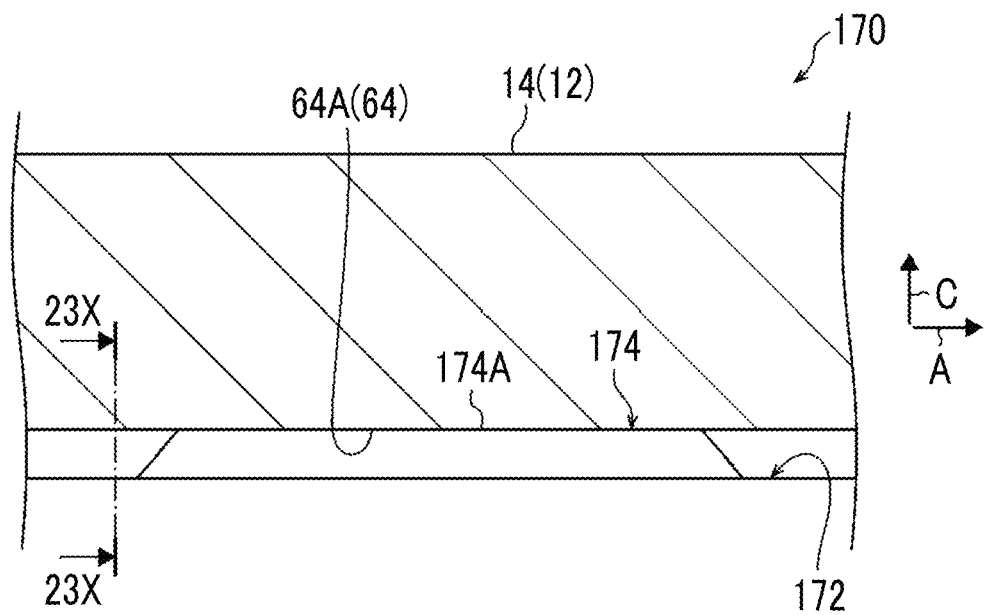
FIG. 22 is a sectional side view of the periphery of a protrusion of a door of a magnetic tape cartridge of a modification example.
Figure 23:
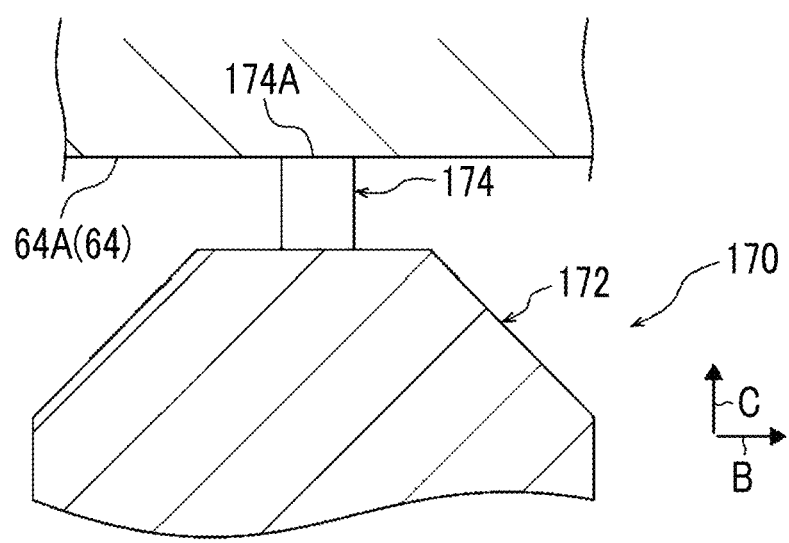
FIG. 23 is a sectional view taken along the line 23X-23X of FIG. 22.

In the above-described embodiment, although the upper protrusion 114 and the lower protrusion 116 have a shape in which the width dimension is reduced toward the distal end side as viewed from the front-rear direction of the case 12, the technique of the present disclosure is not limited thereto. For example, like a magnetic tape cartridge 170 shown in FIG. 22, an upper protrusion 174 provided in a door 172 may have a shape in which the length dimension is reduced toward a distal end 174A side as viewed from the right-left direction of the case 12. As an example, the upper protrusion 174 may have a substantially trapezoidal shape as viewed from the right-left direction of the case 12. A lower protrusion (not shown) is also provided in the door 172. The magnetic tape cartridge 170 has a configuration similar to magnetic tape cartridge 10 except that the upper protrusion 174 and the lower protrusion have a shape in which the length dimension is reduced toward the distal end 174A as viewed from the right-left direction. Accordingly, the magnetic tape cartridge 170 can obtain operations similar to the magnetic tape cartridge 10 except for operations obtained in a case where the upper protrusion 114 and the lower protrusion 116 have a shape in which the width dimension is reduced toward the distal end side as viewed from the front-rear direction of the case 12. As shown in FIG. 23 as an example, in the magnetic tape cartridge 170, although the shape of the upper protrusion 114 as viewed from the front-rear direction of the case 12 is the rectangular shape, the technique of the present disclosure is not limited thereto, and the shape of the upper protrusion 114 may be a shape in which the width dimension is reduced toward the distal end side. The upper protrusion 174 is an example of a "protrusion" according to the technique of the present disclosure.

Figure 24:
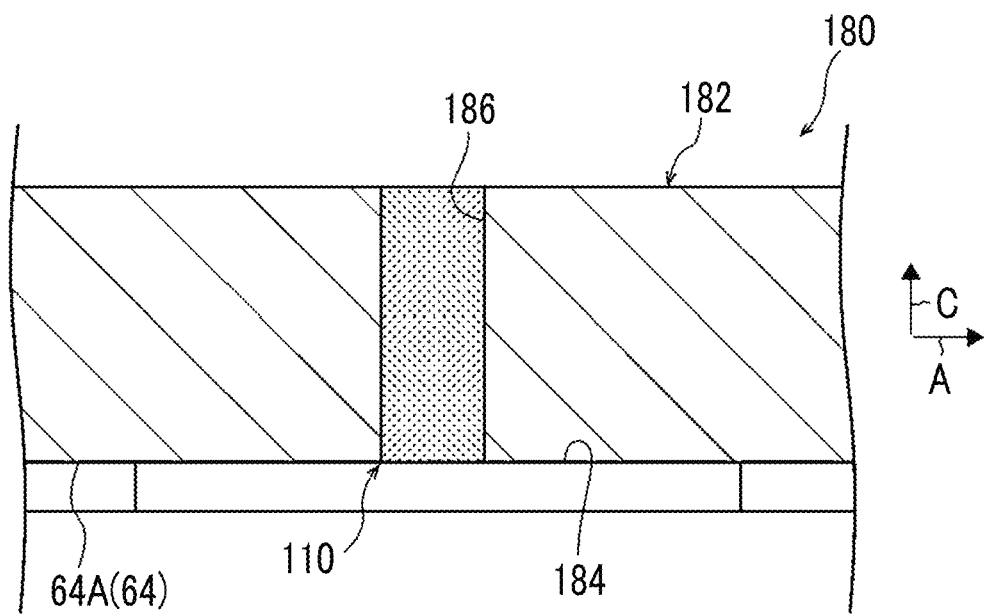
FIG. 24 is a sectional side view of the periphery of a protrusion of a door of a magnetic tape cartridge of a modification example.

In the above-described embodiment, although the upper protrusion 114 and the lower protrusion 116 are fixed to the case 12 by welding, the technique of the present disclosure is not limited thereto. For example, like a magnetic tape cartridge 180 shown in FIG. 24, an upper protrusion 184 and a lower protrusion (not shown) may be fixed to a case 182 by bonding. As an example, in the magnetic tape cartridge 180, a through-hole 186 above the upper protrusion 184 and in a contact region of the upper protrusion 184 and the case 182 is provided in the case 182, and an adhesive is injected from the through-hole 186, thereby bonding the upper protrusion 184 and the case 182. In FIG. 24 as an example, the through-hole 186 is filled with the adhesive and buried. Similarly to the upper protrusion 184, the lower protrusion is also fixed to the case 182 by bonding. The upper protrusion 184 is an example of a "protrusion" according to the technique of the present disclosure.

Figure 25:
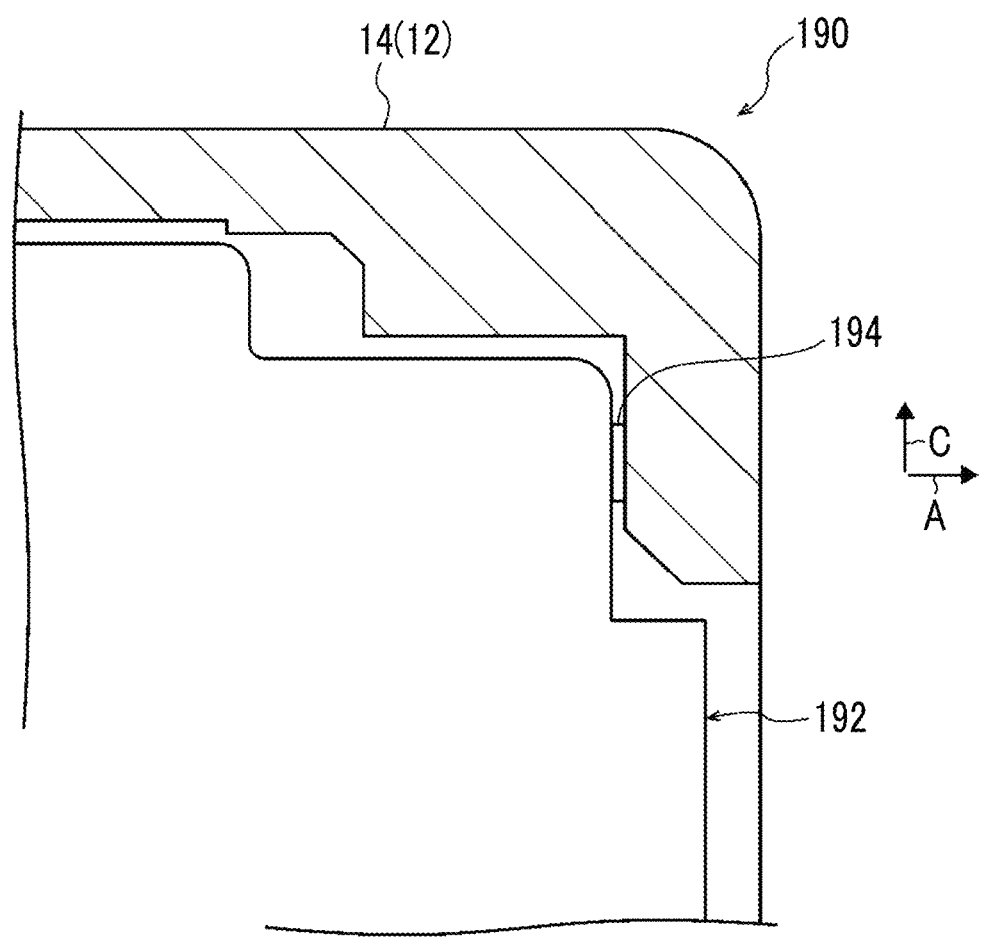
FIG. 25 is a sectional side view of the periphery of a door of a magnetic tape cartridge of a modification example.

In the above-described embodiment, although the upper protrusion 114 is provided on the first surface 50A of the door 50, and the lower protrusion 116 is provided on the second surface 50B, the technique of the present disclosure is not limited thereto. For example, like a magnetic tape cartridge 190 shown in FIG. 25, a protrusion 194 may be provided at a front end of a door 192, and the protrusion 194 may be fixed to a front edge of the opening 18 by welding. The protrusion 194 is an example of a "protrusion" according to the technique of the present disclosure.

In the above-described embodiment, although the upper protrusion 114 is provided on the first surface 50A of the door 50, and the lower protrusion 116 is provided on the second surface 50B, the technique of the present disclosure is not limited thereto. For example, a protrusion that protrudes downward in the case 12 is provided on the bottom surface 64A of the groove 64 of the case 12, and the protrusion may be welded to the first surface 50A of the door 50. A protrusion that protrudes upward may be provided on the bottom surface 65A of the groove 65 of the case 12, and the protrusion may be welded to the second surface 50B of the door 50.

In the above-described embodiment, although the upper protrusion 114 and the lower protrusion 116 are fixed to the case 12 by welding, the technique of the present disclosure is not limited thereto. For example, the upper protrusion 114 and the lower protrusion 116 may be welded to the case 12 by thermal welding.

In the above-described embodiment, although the door 50 is ultrasonic-welded to the case 12 using the horn 122 and the support 124, the technique of the present disclosure is not limited thereto. For example, the door 50 may be ultrasonic-welded in a state of being sandwiched by two horns 122 from both sides in the up-down direction of the case 12 through the case 12.

In the above-described embodiment, although a configuration is made in which the door 50 slides linearly in the front-rear direction of the case 12, the technique of the present disclosure is not limited thereto. For example, the door 50 may be an arc-shaped door that slides in a curved shape. In this case, a sliding direction of the door 50 is an example of a "first direction" according to the technique of the present disclosure.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A magnetic tape cartridge comprising:
   a case that houses a magnetic tape and has an opening;
   a door that is provided in the case and closes the opening; and
   a fixing portion comprising at least one protrusion that fixes the door to the case, the fixing portion including at least one of an ultrasonic welding portion, a terminal welding portion or a bonding portion, and the fixing portion being configured to indicate whether the magnetic tape cartridge has been used or is unused.

2. The magnetic tape cartridge according to claim 1,
wherein the at least one protrusion is formed in the door and is fixed to the case.

3. The magnetic tape cartridge according to claim 2,
wherein the at least one protrusion is fixed to the case by being welded to the case.

4. The magnetic tape cartridge according to claim 3,
wherein the at least one protrusion is welded to the case through an ultrasonic welding portion.

5. The magnetic tape cartridge according to claim 2, further comprising:
a guide mechanism that guides slide of the door in a first direction,
wherein the door has a first surface extending in the first direction, and
the at least one protrusion includes a first protrusion provided on the first surface.

6. The magnetic tape cartridge according to claim 5,
wherein the guide mechanism has a groove having a bottom surface facing the first surface,
the groove houses an end portion on a first surface side of the door, and
the first protrusion is welded to the bottom surface of the groove.

7. The magnetic tape cartridge according to claim 5,
wherein the first protrusion is provided on an end portion side in a closing direction of the door in the first surface.

8. The magnetic tape cartridge according to claim 5,
wherein the first protrusion is an elongated protrusion extending in the first direction.

9. The magnetic tape cartridge according to claim 8,
wherein the first protrusion has a shape in which a width dimension is reduced toward a distal end side.

10. The magnetic tape cartridge according to claim 5,
wherein the first protrusion has a shape in which a cross-sectional area is reduced from a proximal end side toward a distal end side.

11. The magnetic tape cartridge according to claim 5,
wherein the door has the first surface, and a second surface that is formed on an opposite side to the first surface in a second direction crossing the first direction and extends in the first direction, and
wherein the first protrusion is provided on the first surface, and a second protrusion is provided on the second surface.

12. The magnetic tape cartridge according to claim 11,
wherein the first protrusion is provided at a position on an opposite side to the second protrusion in the second direction.

13. The magnetic tape cartridge according to claim 11,
wherein the first protrusion and the second protrusion have the same shape.

14. A method of manufacturing a magnetic tape cartridge, the method comprising:
providing a door in a case housing a magnetic tape and having an opening to close the opening with the door; and
fixing the door to the case via a fixing portion, the fixing portion comprising at least one protrusion that fixes the door to the case, the fixing portion including at least one of an ultrasonic welding portion, a terminal welding portion or a bonding portion, and the fixing portion being configured to indicate whether the magnetic tape cartridge has been used or is unused.

15. The method of manufacturing a magnetic tape cartridge according to claim 14,
wherein the fixing of the door to the case includes fixing the at least one protrusion formed in the door to the case through ultrasonic welding.

\* \* \* \* \*